United States Patent
Deckman et al.

(10) Patent No.: US 10,035,096 B2
(45) Date of Patent: Jul. 31, 2018

(54) METHOD AND APPARATUS FOR REMOVAL OF OIL FROM UTILITY GAS STREAM

(71) Applicants: Harry W. Deckman, Clinton, NJ (US); Preeti Kamakoti, Summit, NJ (US); Peter I. Ravikovitch, Princeton, NJ (US); Bruce T. Kelley, Porter, TX (US); P. Scott Northrop, Spring, TX (US); Peter C. Rasmussen, Navarre, FL (US); Paul L. Tanaka, Spring, TX (US); Martin N. Webster, Pennington, NJ (US); Wieslaw J. Roth, Sewell, NJ (US); Edward W. Corcoran, Jr., Easton, PA (US)

(72) Inventors: Harry W. Deckman, Clinton, NJ (US); Preeti Kamakoti, Summit, NJ (US); Peter I. Ravikovitch, Princeton, NJ (US); Bruce T. Kelley, Porter, TX (US); P. Scott Northrop, Spring, TX (US); Peter C. Rasmussen, Navarre, FL (US); Paul L. Tanaka, Spring, TX (US); Martin N. Webster, Pennington, NJ (US); Wieslaw J. Roth, Sewell, NJ (US); Edward W. Corcoran, Jr., Easton, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 355 days.

(21) Appl. No.: 14/807,742

(22) Filed: Jul. 23, 2015

(65) Prior Publication Data

US 2015/0328578 A1 Nov. 19, 2015

Related U.S. Application Data

(62) Division of application No. 12/921,532, filed as application No. PCT/US2009/037550 on Mar. 18, 2009, now Pat. No. 9,126,138.

(Continued)

(51) Int. Cl.
*B01D 53/00* (2006.01)
*B01D 53/04* (2006.01)
*B01D 53/047* (2006.01)

(52) U.S. Cl.
CPC ......... *B01D 53/04* (2013.01); *B01D 53/0407* (2013.01); *B01D 53/047* (2013.01);
(Continued)

(58) Field of Classification Search
CPC ..... B01D 53/00; B01D 53/04–53/0446; B01D 53/0407; B01D 53/04838; B01D 53/0462;
(Continued)

(56) References Cited

U.S. PATENT DOCUMENTS

| 1,868,138 A | 7/1932 | Fisk |
| 3,124,152 A | 3/1964 | Payne ........................ 137/269.5 |

(Continued)

FOREIGN PATENT DOCUMENTS

| CA | 2224471 | 6/1998 | ........... B01D 53/047 |
| CA | 2228206 | 7/1998 | ........... B01D 53/047 |

(Continued)

OTHER PUBLICATIONS

Conviser, S.A. (1964) "Removal of $CO_2$ from Natural Gas With Molecular Sieves," *Publication*, pp. 1F-12F.

(Continued)

*Primary Examiner* — T. Bennett McKenzie
(74) *Attorney, Agent, or Firm* — ExxonMobil Upstream Research Company

(57) ABSTRACT

The present application is directed to a method and system for preparing gaseous utility streams from gaseous process streams, particularly, removing oil contamination from such streams prior to use in a dry gas seal. The methods and systems may include at least one kinetic swing adsorption process including pressure swing adsorption, temperature (Continued)

swing adsorption, calcination, and inert purge processes to treat gaseous streams for use in dry gas seals of rotating equipment such as compressors, turbines and pumps and other utilities. The adsorbent materials used include a high surface area solid structured microporous and mesoporous materials.

24 Claims, 7 Drawing Sheets

Related U.S. Application Data

(60) Provisional application No. 61/125,939, filed on Apr. 30, 2008.

(52) U.S. Cl.
CPC ..... *B01D 53/0438* (2013.01); *B01D 53/0462* (2013.01); *B01D 53/0473* (2013.01); *B01D 53/0476* (2013.01); *B01D 2253/102* (2013.01); *B01D 2253/104* (2013.01); *B01D 2253/108* (2013.01); *B01D 2253/1085* (2013.01); *B01D 2253/1124* (2013.01); *B01D 2253/20* (2013.01); *B01D 2253/204* (2013.01); *B01D 2253/342* (2013.01); *B01D 2257/70* (2013.01); *B01D 2259/40088* (2013.01)

(58) Field of Classification Search
CPC .............. B01D 53/047; B01D 53/0473; B01D 53/0476; B01D 2253/102; B01D 2253/104; B01D 2253/108; B01D 2253/1085; B01D 2253/1124; B01D 2253/20; B01D 2253/204; B01D 2253/342; B01D 2257/70; B01D 2259/4088
USPC .......................................................... 203/41
See application file for complete search history.

(56) References Cited

U.S. PATENT DOCUMENTS

| | | | |
|---|---|---|---|
| 3,142,547 A | 7/1964 | Marsh et al. ...................... 55/26 |
| 3,420,434 A | 1/1969 | Swearingen .................. 230/116 |
| 3,508,758 A | 4/1970 | Strub .............................. 277/15 |
| 3,602,247 A | 8/1971 | Bunn et al. ................... 137/270 |
| 3,788,036 A | 1/1974 | Lee et al. ......................... 55/25 |
| 3,967,464 A | 7/1976 | Cormier et al. .................. 62/13 |
| 4,261,815 A | 4/1981 | Kelland ........................ 209/213 |
| 4,324,565 A | 4/1982 | Benkmann ....................... 55/23 |
| 4,325,565 A | 4/1982 | Winchell ...................... 280/282 |
| 4,329,162 A | 5/1982 | Pitcher, Jr. ..................... 55/523 |
| 4,340,398 A | 7/1982 | Doshi et al. ..................... 55/25 |
| 4,398,926 A * | 8/1983 | Doshi ................. B01D 53/047 95/103 |
| 4,445,441 A | 5/1984 | Tanca ........................... 110/165 |
| 4,531,070 A * | 7/1985 | Kuhn ....................... H02K 9/26 310/56 |
| 4,711,968 A | 12/1987 | Oswald et al. ............... 568/454 |
| 4,770,676 A | 9/1988 | Sircar et al. ..................... 55/26 |
| 4,784,672 A | 11/1988 | Sircar ............................. 55/26 |
| 4,790,272 A | 12/1988 | Woolenweber ............... 123/188 |
| 4,816,039 A | 3/1989 | Krishnamurthy et al. ........ 55/26 |
| 4,877,429 A | 10/1989 | Hunter .......................... 55/162 |
| 4,964,889 A * | 10/1990 | Chao ...................... B01D 53/02 423/239.1 |
| 4,977,745 A | 12/1990 | Heichberger ...................... 62/10 |
| 5,110,328 A | 5/1992 | Yokota et al. ................. 55/180 |
| 5,125,934 A | 6/1992 | Krishnamurthy et al. ........ 55/25 |
| 5,169,006 A | 12/1992 | Stelzer ........................ 209/223.1 |
| 5,174,796 A | 12/1992 | Davis et al. ...................... 55/26 |
| 5,224,350 A | 7/1993 | Mehra ............................. 62/17 |
| 5,234,472 A | 8/1993 | Krishnamurthy et al. ........ 95/98 |
| 5,292,990 A | 3/1994 | Kantner et al. ............... 585/820 |
| 5,306,331 A | 4/1994 | Auvil et al. ...................... 95/42 |
| 5,370,728 A | 12/1994 | LaSala et al. .................. 95/101 |
| 5,565,018 A | 10/1996 | Baksh et al. ................... 95/100 |
| 5,700,310 A | 12/1997 | Bowman et al. ................ 95/45 |
| 5,750,026 A | 5/1998 | Gadkaree et al. .......... 210/502.1 |
| 5,792,239 A | 8/1998 | Reinhold et al. .............. 95/101 |
| 5,807,423 A | 9/1998 | Lemcoff et al. ................. 95/96 |
| 5,811,616 A | 9/1998 | Holub et al. .................. 585/504 |
| 5,827,358 A | 10/1998 | Kulish et al. .................. 96/115 |
| 5,906,673 A | 5/1999 | Reinhold, III et al. .......... 95/45 |
| 5,924,307 A | 7/1999 | Nenov .......................... 62/643 |
| 5,935,444 A | 8/1999 | Johnson et al. ............... 210/691 |
| 5,968,234 A | 10/1999 | Midgett, II et al. ............ 95/120 |
| 5,976,221 A | 11/1999 | Bowman et al. ................ 95/45 |
| 5,997,617 A | 12/1999 | Czabala et al. ................ 96/130 |
| 6,007,606 A | 12/1999 | Baksh et al. .................... 95/98 |
| 6,011,192 A | 1/2000 | Baker et al. .................. 585/818 |
| 6,017,508 A * | 1/2000 | Millar .................... B01J 20/103 423/328.1 |
| 6,053,966 A | 4/2000 | Moreau et al. .................. 95/96 |
| 6,063,161 A | 5/2000 | Keefer et al. .................. 95/100 |
| 6,099,621 A | 8/2000 | Ho .................................. 95/139 |
| 6,129,780 A | 10/2000 | Millet et al. .................. 95/117 |
| 6,136,222 A | 10/2000 | Friesen et al. ................ 252/184 |
| 6,147,126 A | 11/2000 | DeGeorge et al. ............ 518/715 |
| 6,171,371 B1 | 1/2001 | Derive et al. .................... 95/98 |
| 6,176,897 B1 | 1/2001 | Keefer ............................. 95/98 |
| 6,179,900 B1 | 1/2001 | Behling et al. ................... 95/45 |
| 6,210,466 B1 | 4/2001 | Whysall et al. ................ 95/100 |
| 6,231,302 B1 | 5/2001 | Bonardi ......................... 415/105 |
| 6,245,127 B1 | 6/2001 | Kane et al. .................... 95/101 |
| 6,284,021 B1 | 9/2001 | Lu et al. .......................... 95/96 |
| 6,311,719 B1 | 11/2001 | Hill et al. ...................... 137/312 |
| 6,345,954 B1 | 2/2002 | Al-Himyary et al. ......... 415/112 |
| 6,398,853 B1 | 6/2002 | Keefer et al. .................. 96/125 |
| 6,406,523 B1 | 6/2002 | Connor et al. ................. 96/125 |
| 6,436,171 B1 | 8/2002 | Wang et al. ...................... 95/96 |
| 6,444,012 B1 | 9/2002 | Dolan et al. ...................... 95/99 |
| 6,444,014 B1 | 9/2002 | Mullhaupt et al. ............. 95/130 |
| 6,444,523 B1 | 9/2002 | Fan et al. ....................... 438/257 |
| 6,451,095 B1 | 9/2002 | Keefer et al. .................. 96/125 |
| 6,457,485 B2 | 10/2002 | Hill et al. ...................... 137/240 |
| 6,471,939 B1 | 10/2002 | Boix et al. .................... 423/706 |
| 6,488,747 B1 | 12/2002 | Keefer et al. .................. 96/125 |
| 6,497,750 B2 | 12/2002 | Butwell et al. .................. 95/96 |
| 6,500,241 B2 | 12/2002 | Reddy ........................... 96/134 |
| 6,500,404 B1 | 12/2002 | Camblor Fernandez et al. ............................. 423/706 |
| 6,506,351 B1 | 1/2003 | Jain et al. ................... 423/239.1 |
| 6,517,609 B1 | 2/2003 | Monereau et al. ............... 95/96 |
| 6,531,516 B2 | 3/2003 | Davis et al. ................... 518/700 |
| 6,533,846 B1 | 3/2003 | Keefer et al. .................. 96/125 |
| 6,565,627 B1 | 5/2003 | Golden et al. ................... 95/96 |
| 6,565,635 B2 | 5/2003 | Keefer et al. .................. 96/125 |
| 6,565,825 B2 | 5/2003 | Ohji et al. ..................... 423/625 |
| 6,572,678 B1 | 6/2003 | Wijmans et al. ................. 95/47 |
| 6,579,341 B2 | 6/2003 | Baker et al. ..................... 95/39 |
| 6,593,541 B1 | 7/2003 | Herren ...................... 219/212.67 |
| 6,595,233 B2 | 7/2003 | Pulli ......................... 137/115.05 |
| 6,605,136 B1 | 8/2003 | Graham et al. .................. 95/98 |
| 6,607,584 B2 | 8/2003 | Moreau et al. ................ 95/117 |
| 6,630,012 B2 | 10/2003 | Wegeng et al. ................ 95/106 |
| 6,641,645 B1 | 11/2003 | Lee et al. ........................ 95/98 |
| 6,651,645 B1 | 11/2003 | Nunez Suarez ................ 126/9 |
| 6,660,065 B2 | 12/2003 | Byrd et al. .................... 95/117 |
| 6,712,087 B2 | 3/2004 | Hill et al. ...................... 137/240 |
| 6,743,278 B1 * | 6/2004 | Carruthers .......... B01D 53/0407 55/DIG. 5 |
| 6,746,515 B2 | 6/2004 | Wegeng et al. .................. 95/96 |
| 6,752,852 B1 | 6/2004 | Jacksier et al. ................. 95/117 |
| 6,770,120 B2 | 8/2004 | Neu et al. ....................... 95/96 |
| 6,773,225 B2 | 8/2004 | Yuri et al. ....................... 415/1 |
| 6,802,889 B2 | 10/2004 | Graham et al. .................. 95/96 |
| 6,835,354 B2 | 12/2004 | Woods .......................... 422/139 |
| 6,890,376 B2 | 5/2005 | Arquin et al. .................. 96/134 |
| 6,916,358 B2 | 7/2005 | Nakamura et al. .............. 95/96 |
| 6,918,953 B2 | 7/2005 | Lomax, Jr. et al. ............ 96/130 |

(56) References Cited

U.S. PATENT DOCUMENTS

| | | | |
|---|---|---|---|
| 6,974,496 B2 | 12/2005 | Wegeng et al. | 96/126 |
| 7,025,801 B2 | 4/2006 | Monereau | 95/8 |
| 7,027,929 B2 | 4/2006 | Wang | 702/14 |
| 7,074,323 B2 | 7/2006 | Ghijsen | 208/101 |
| 7,094,275 B2 | 8/2006 | Keefer et al. | 96/125 |
| 7,117,669 B2 | 10/2006 | Kaboord et al. | 60/288 |
| 7,122,073 B1 * | 10/2006 | Notaro | B01D 53/0431 96/130 |
| 7,128,775 B2 | 10/2006 | Celik et al. | 96/121 |
| 7,144,016 B2 | 12/2006 | Gozdawa | 277/399 |
| 7,160,356 B2 | 1/2007 | Koros et al. | 95/50 |
| 7,160,367 B2 | 1/2007 | Babicki et al. | 96/116 |
| 7,166,149 B2 | 1/2007 | Dunne et al. | 95/113 |
| 7,189,280 B2 | 3/2007 | Alizadeh-Khiavi et al. | 95/130 |
| 7,250,074 B2 | 7/2007 | Tonkovich et al. | 95/130 |
| 7,255,727 B2 | 8/2007 | Monereau et al. | 95/96 |
| 7,258,725 B2 | 8/2007 | Ohmi et al. | 141/4 |
| 7,276,107 B2 | 10/2007 | Baksh et al. | 95/96 |
| 7,297,279 B2 | 11/2007 | Johnson et al. | 210/669 |
| 7,311,763 B2 | 12/2007 | Neary | 96/121 |
| RE40,006 E | 1/2008 | Keefer et al. | 95/100 |
| 7,314,503 B2 | 1/2008 | Landrum et al. | 95/130 |
| 7,390,350 B2 | 6/2008 | Weist, Jr. et al. | 95/100 |
| 7,404,846 B2 | 7/2008 | Golden et al. | 95/103 |
| 7,449,049 B2 | 11/2008 | Thomas et al. | 95/123 |
| 7,456,131 B2 | 11/2008 | Klett et al. | 502/60 |
| 7,527,670 B2 | 5/2009 | Ackley et al. | 95/96 |
| 7,578,864 B2 | 8/2009 | Watanabe et al. | 55/523 |
| 7,604,682 B2 | 10/2009 | Seaton | 95/96 |
| 7,637,989 B2 | 12/2009 | Bong | 96/130 |
| 7,641,716 B2 | 1/2010 | Lomax, Jr. et al. | 95/96 |
| 7,645,324 B2 | 1/2010 | Rode et al. | 95/96 |
| 7,651,549 B2 | 1/2010 | Whitley | 95/96 |
| 7,674,319 B2 | 3/2010 | Lomax, Jr. et al. | 95/19 |
| 7,687,044 B2 | 3/2010 | Keefer et al. | 422/211 |
| 7,713,333 B2 | 5/2010 | Rege et al. | 95/96 |
| 7,722,700 B2 | 5/2010 | Sprinkle | 95/22 |
| 7,731,782 B2 | 6/2010 | Kelley et al. | 95/139 |
| 7,740,687 B2 | 6/2010 | Reinhold, III | 95/96 |
| 7,744,676 B2 | 6/2010 | Leitmayr et al. | 95/99 |
| 7,744,677 B2 | 6/2010 | Barclay et al. | 95/114 |
| 7,758,051 B2 | 7/2010 | Roberts-Haritonov et al. | 277/387 |
| 7,763,098 B2 | 7/2010 | Alizadeh-Khiavi et al. | 95/96 |
| 7,763,099 B2 | 7/2010 | Verma et al. | 95/96 |
| 7,785,405 B2 | 8/2010 | Manning et al. | 96/112 |
| 7,792,983 B2 | 9/2010 | Mishra et al. | 709/231 |
| 7,806,965 B2 | 10/2010 | Stinson | 95/187 |
| 7,819,948 B2 | 10/2010 | Wagner | 95/100 |
| 7,828,880 B2 | 11/2010 | Moriya et al. | 95/210 |
| 7,858,169 B2 | 12/2010 | Yamashita | 428/116 |
| 7,867,320 B2 | 1/2011 | Baksh et al. | 95/96 |
| 7,938,886 B2 | 5/2011 | Hershkowitz et al. | 95/115 |
| 7,947,118 B2 | 5/2011 | Rarig et al. | 95/96 |
| 7,947,120 B2 | 5/2011 | Deckman et al. | 95/139 |
| 7,959,720 B2 | 6/2011 | Deckman et al. | 96/130 |
| 8,034,164 B2 | 10/2011 | Lomax, Jr. et al. | 95/121 |
| 8,071,063 B2 | 12/2011 | Reyes et al. | 423/248 |
| 8,142,745 B2 | 3/2012 | Reyes et al. | 423/213.2 |
| 8,142,746 B2 | 3/2012 | Reyes et al. | 423/213.2 |
| 8,192,709 B2 | 6/2012 | Reyes et al. | 423/245.1 |
| 8,262,783 B2 | 9/2012 | Stoner et al. | 96/108 |
| 8,268,043 B2 | 9/2012 | Celik et al. | 95/96 |
| 8,272,401 B2 | 9/2012 | McLean | 137/625.11 |
| 8,319,090 B2 | 11/2012 | Kitamura | 136/244 |
| 8,337,594 B2 | 12/2012 | Corma Canos et al. | 95/130 |
| 8,361,200 B2 | 1/2013 | Sayari | 95/139 |
| 8,361,205 B2 | 1/2013 | Desai et al. | 96/121 |
| 8,377,173 B2 | 2/2013 | Chuang | 95/135 |
| 8,444,750 B2 | 5/2013 | Deckman et al. | 95/96 |
| 8,480,795 B2 | 7/2013 | Siskin et al. | 95/235 |
| 8,512,569 B2 | 8/2013 | Eaton et al. | 210/650 |
| 8,529,662 B2 | 9/2013 | Kelley et al. | 95/96 |
| 8,529,663 B2 | 9/2013 | Reyes et al. | 95/96 |
| 8,529,664 B2 | 9/2013 | Deckman et al. | 95/96 |
| 8,529,665 B2 | 9/2013 | Manning et al. | 95/96 |
| 8,545,602 B2 | 10/2013 | Chance et al. | 95/96 |
| 8,573,124 B2 | 11/2013 | Havran et al. | 102/206 |
| 8,591,627 B2 | 11/2013 | Jain | 95/52 |
| 8,657,922 B2 | 2/2014 | Yamawaki et al. | 95/96 |
| 8,673,059 B2 | 3/2014 | Leta et al. | 95/96 |
| 8,784,533 B2 | 7/2014 | Leta et al. | 95/97 |
| 8,784,534 B2 | 7/2014 | Kamakoti et al. | 95/97 |
| 8,784,535 B2 | 7/2014 | Ravikovitch et al. | 95/98 |
| 8,808,426 B2 | 8/2014 | Sundaram | 95/96 |
| 8,814,985 B2 | 8/2014 | Gerds et al. | 95/90 |
| 8,852,322 B2 | 10/2014 | Gupta et al. | 95/136 |
| 8,858,683 B2 | 10/2014 | Deckman | 95/96 |
| 8,906,138 B2 | 12/2014 | Rasmussen et al. | 95/96 |
| 8,921,637 B2 | 12/2014 | Sundaram et al. | 585/823 |
| 8,939,014 B2 | 1/2015 | Kamakoti et al. | 73/38 |
| 9,005,561 B2 | 4/2015 | Leta et al. | |
| 9,067,168 B2 | 6/2015 | Frederick et al. | 96/108 |
| 9,126,138 B2 | 9/2015 | Deckman et al. | |
| 2003/0131728 A1 | 7/2003 | Kanazirev et al. | 95/96 |
| 2003/0170527 A1 | 9/2003 | Finn et al. | 429/34 |
| 2004/0072674 A1 * | 4/2004 | Ozin | B01J 29/0308 502/60 |
| 2004/0197596 A1 | 10/2004 | Connor et al. | 428/630 |
| 2005/0014511 A1 | 1/2005 | Spain | 455/456.1 |
| 2005/0129952 A1 | 6/2005 | Sawada et al. | 428/409 |
| 2006/0048648 A1 | 3/2006 | Gibbs et al. | 96/108 |
| 2006/0049102 A1 | 3/2006 | Miller et al. | 210/500.27 |
| 2006/0105158 A1 | 5/2006 | Fritz et al. | 428/317.9 |
| 2006/0165574 A1 | 7/2006 | Sayari | 423/210 |
| 2007/0084241 A1 | 4/2007 | Kretchmer et al. | 63/29.2 |
| 2008/0072822 A1 | 3/2008 | White | 118/722 |
| 2008/0237131 A1 * | 10/2008 | Brown | B01D 53/0438 210/656 |
| 2008/0282887 A1 * | 11/2008 | Chance | B01D 53/02 95/98 |
| 2009/0004073 A1 | 1/2009 | Gleize et al. | 422/180 |
| 2009/0079870 A1 | 3/2009 | Matsui | 348/558 |
| 2010/0252497 A1 | 10/2010 | Ellison et al. | 210/500.1 |
| 2010/0282593 A1 | 11/2010 | Speirs et al. | 203/11 |
| 2011/0217218 A1 | 9/2011 | Gupta et al. | 423/228 |
| 2011/0308524 A1 | 12/2011 | Brey et al. | 128/205.12 |
| 2012/0031144 A1 | 2/2012 | Northrop et al. | 62/617 |

FOREIGN PATENT DOCUMENTS

| | | | |
|---|---|---|---|
| CA | 2234924 | 10/1998 | B10D 53/047 |
| CA | 2237103 | 11/1998 | B01D 53/047 |
| CA | 2297590 | 8/2000 | B01D 53/047 |
| CA | 2297591 | 8/2000 | F17D 1/02 |
| CA | 2357356 | 3/2002 | B01D 53/047 |
| EP | 0257493 | 3/1988 | B01D 53/04 |
| EP | 0426937 | 5/1991 | B01D 53/04 |
| EP | 1004341 | 5/2000 | B01D 53/047 |
| EP | 1018359 | 7/2000 | B01D 53/047 |
| EP | 1413348 | 4/2004 | B01D 53/04 |
| EP | 1577561 | 9/2005 | F04D 29/10 |
| EP | 1203610 | 12/2005 | B01D 53/053 |
| EP | 1798197 | 6/2007 | C01B 21/04 |
| EP | 1045728 | 11/2009 | B01D 53/00 |
| JP | 58-114715 | 7/1983 | B01D 53/34 |
| JP | 59-232174 | 12/1984 | C10K 1/32 |
| JP | 2000-024445 | 1/2000 | B01D 53/00 |
| JP | 2002-348651 | 12/2002 | C23C 2/20 |
| JP | 2006-016470 | 1/2006 | C10K 1/32 |
| JP | 2006-036849 | 2/2006 | B01D 53/14 |
| JP | 2008-272534 | 7/2006 | A62D 3/40 |
| WO | WO1999/043418 | 9/1999 | B01D 53/053 |
| WO | WO2007/111738 | 10/2007 | F25J 3/08 |
| WO | WO2010/130787 | 11/2010 | B01D 53/014 |
| WO | WO2011/139894 | 11/2011 | B01D 53/047 |
| WO | WO2012/118755 | 9/2012 | B01J 20/28 |
| WO | WO2012/118757 | 9/2012 | F16K 11/00 |
| WO | WO2012/118758 | 9/2012 | B01D 53/26 |
| WO | WO2012/118759 | 9/2012 | B01D 53/047 |
| WO | WO2012/118760 | 9/2012 | B01D 53/047 |
| WO | WO2012/161826 | 11/2012 | B01D 59/026 |

(56) References Cited

FOREIGN PATENT DOCUMENTS

| WO | WO2012/161828 | 11/2012 | ........... B01D 59/026 |
| WO | WO2013/022529 | 2/2013 | ........... B01D 53/002 |

OTHER PUBLICATIONS

ExxonMobil Research and Engineering and Xebec (2008) RCPSA-Rapid Cycle Pressure Swing Adsorption—An Advanced, Low-Cost Commercialized $H_2$ Recovery Process, *Brochure*, 2 pages.

ExxonMobil Research and Engineering and QuestAir (2008) "A New Commercialized Process for Lower Cost H2 Recovery-Rapid Cycle Pressure Swing Adsorption (RCPSA)," *Brochure*, 4 pages.

Farooq, S. et al. (1990) "Continuous Countercurrent Flow Model for a Bulk PSA Separation Process," *AIChE J.*, v.36(2), pp. 310-314.

FlowServe (2005) "Exceeding Expectations, US Navy Cuts Maintenance Costs With Flowserve GX-200, Non-Contacting Seal Retrofits," *Face-to-Face*, v. 17.1.

GE Oil & Gas (2007) "Dry Gas Seal Retrofit," Florence, Italy, www.ge.com/oilandgas.

Herrmann, F. J. et al. (2008) "Curvelet-Based Seismic Data Processing: A Multiscale and Nonlinear Approach," *Geophysics*, v.73, pp. A1-A5.

Hopper, Bruce L. et al. (2008) "World's First 10,000 PSI Sour Gas Injection Compressor," *Proceedings of the 37$^{th}$ Turbomachinery Symposium*, pp. 73-95. http://turbolab.tamu.edu/uploads/files/papers/t37/T37-LEV08.pdf.

Reyes, S. C. et al. (1997) "Frequency Modulation Methods for Diffusion and Adsorption Measurements in Porous Solids," *J. Phys. Chem. B*, v.101, pp. 614-622.

Sahni, I. et al. (2005) "Multiresolution Wavelet Analysis for Improved Reservoir Description," SPE-87820, *Soc, of Petroleum Eng.-Reservoir Evaluation & Engineering*, pp. 53-69 (XP002550569).

Stahley, J. S. (2003) "Design, Operation, and Maintenance Considerations for Improved Dry Gas Seal Reliability in Centrigugal Compressors," *Dresser-Rand Co.*, 15 pages.

Suzuki, M. (1985) "Continuous-Countercurrent-Flow Approximation for Dynamic Steady State Profile of Pressure Swing Adsorption," *AIChE Symp., Ser.*, v.81(242), pp. 67-73.

\* cited by examiner

METHOD AND APPARATUS FOR REMOVAL OF OIL FROM UTILITY GAS STREAM

CROSS REFERENCE TO RELATED APPLICATIONS

This application is a divisional of U.S. patent application Ser. No. 12/921,532 which published as U. S. Patent Publication No 2011/0031103, which is the National Stage entry under 35 U.S.C. 371 of International Patent Application No. PCT/US2009/037550, filed 18 Mar. 2009, which published as International Patent Publication No. WO2009/134,543 and claims the benefit of and priority from U.S. Provisional Patent Application No. 61/125,939, filed 30 Apr. 2008, the entirety of which are each incorporated by reference herein, for all purposes.

FIELD OF THE INVENTION

This invention relates generally to methods of processing gaseous slip streams. More specifically, the invention relates to a process and apparatus for removing oil from a process slip stream used as a utility gas in a utility component.

BACKGROUND

This section is intended to introduce the reader to various aspects of art, which may be associated with exemplary embodiments of the present invention, which are described and/or claimed below. This discussion is believed to be helpful in providing the reader with information to facilitate a better understanding of particular techniques of the present invention. Accordingly, it should be understood that these statements are to be read in this light, and not necessarily as admissions of prior art.

Environmentally conscious and efficient recovery of oil and gas from hydrocarbon reservoirs is a multidimensional problem that has become one of the world's toughest energy challenges. Injection of various gasses into such reservoirs is now utilized for sequestration, pressure maintenance, or enhanced oil recovery operations. In recent years, injection compressor technology has advanced to the point that development plans for some oil and gas fields incorporate them to inject acid or sour gas in underground formations for sequestration or enhanced oil recovery (EOR) operations. The compressor shafts are typically sealed using dry gas seals (DGS) which utilize the principle of sealing between a stationary face against a rotating face by using a gas fluid film. This "seal gas" provides the lubrication and cooling properties needed by the seal for long and reliable operation. Seal gas should be free of particulates, liquids, and heavy components that condense out of the seal gas when expanded across the seal faces.

Typically, dry seal compressors pressurize injection gas streams (e.g. acid or sour gas streams) to pressures in excess of about 4,000 pounds per square inch absolute (psia) with stream flow rates in excess of 100 million standard cubic feet per day (SCFD). To operate without failure, the seals in the compressors should be lubricated with a gas stream that will not condense a liquid phase as its pressure drops when it expands across the seal faces. The seal gas pressure is greater than the compressor suction pressure, but less than the compressor discharge pressure.

One strategy for producing a non-condensing seal gas is to compress a purified low pressure (e.g. less than about 800 psia) methane or nitrogen stream in a reciprocating compressor. Reciprocating compressors are lubricated with cylinder oil that has some miscibility with the gas, especially at high (e.g. greater than about 2,000 psia) pressures. After compression, the gas stream contains oil in the form of either vapor or entrained droplets. The vapor generally can not be filtered out and at high pressures filtration of entrained droplets is typically inefficient. Thus the oil in the high pressure methane stream will have a liquid phase that is either entrained or "drops out" of the gas when the pressure is dropped through the seals or at pressure regulators that control the pressure to the seals. This cylinder oil "carry-over" into the seal gas is expected to damage and cause premature failure of standard dry seal compressors, resulting in significant down-time and lost production.

In some situations, such as high pressure sour gas service, the seal gas has been obtained from a utility source such as a fuel gas system. Fuel gas is predominantly composed of methane, but can contain some amounts of heavier hydrocarbons, $CO_2$, $N_2$ and small quantities of $H_2S$. A typical source of fuel gas for compressor applications is a slip stream taken from the process gas being fed to the dry seal compressor. At low pressures (e.g. similar to the suction pressure of the dry seal compressor), many different technologies such as absorption, gas/liquid phase separation, and glycol dehydration can be used to condition a slip stream for use as fuel gas.

Purifying a slip stream taken from the high pressure discharge of the dry seal compressor is technically challenging. The fuel gas or gas from-another utility gas source is then compressed and used as seal gas. Such gas is used to avoid the liquid contamination or liquid drop out encountered by using the process gas. This requires additional process and separation units to generate the fuel gas and a separate seal gas booster compressor (e.g. a reciprocating compressor), which can itself be a source of oil and particulate contamination. A reciprocating compressor is usually used for this service due to the high compression ratios and low flows. Reciprocating compressors of this type are typically lubricated with cylinder oil that has some miscibility with the gas, especially at high pressures. Thus, it can not be filtered out at high pressure but condenses or "drops out" of the gas when the pressure is dropped through the seals or at pressure regulators that control the pressure to the seals. This cylinder oil "carry-over" into the seal gas may damage and cause premature failure of standard DGS's.

U.S. Pat. No. 5,976,221 discloses a method of oil removal from vapor utilizing polymeric adsorption. Such a method only removes about 99.9% of the oil. Such results are good, but even a small amount of oil can damage a DGS and cause significant downtime.

U.S. Pat. No. 4,325,565 discloses a method of oil removal including heating the gas stream to fully vaporize the oil in the stream before adsorbing the oil. Although this technique appeared to be effective, it requires additional energy use and processing equipment to achieve beneficial results.

Hence, an improved method of removing oil from process gas for use in dry seals is needed.

SUMMARY

In one embodiment, a system for treating a gaseous feed stream is provided. The system includes: a selective component removal system, comprising a gaseous feed stream inlet configured to pass a gaseous feed stream into a swing adsorption unit having at least one structured adsorbent bed. In the system, the gaseous feed stream includes a volume of oil droplets and a volume of oil vapor and has a pressure of at least about 1,000 pounds per square inch; the at least one structured adsorbent bed is configured to remove at least a portion of the volume of oil droplets and a portion of the volume of oil vapor to provide a substantially oil-free gaseous outlet stream; and the at least one structured adsorbent bed is regenerated in a kinetic swing adsorption process.

In another embodiment of the present invention, a method of treating a gaseous feed stream is provided. The method includes: providing a gaseous feed stream having a volume of oil therein; treating the gaseous feed stream using a selective component removal system having at least one swing adsorption process unit to form a utility stream for use in a utility component, wherein the at least one swing adsorption process unit includes a structured adsorbent bed configured to remove at least a portion of the volume of oil; regenerating the swing adsorption process unit in a calcination process; feeding the utility stream into the utility component, wherein the utility stream is compatible with the utility component; and utilizing the utility stream in the utility component.

In a third embodiment of the invention, a structured adsorbent contactor is provided. The contactor includes: an inlet end; an outlet end; and a plurality of open flow channels extending from the inlet end to the outlet end, wherein a portion of the plurality of open flow channels are sealed at the inlet end and the remainder of the plurality of flow channels are sealed at the outlet end, and wherein the surface of the open flow channels are comprised of an adsorbent material having a selectivity for a first component over a second component of a mixture greater than one.

BRIEF DESCRIPTION OF THE DRAWINGS

The foregoing and other advantages of the present technique may become apparent upon reading the following detailed description and upon reference to the drawings in which.

DETAILED DESCRIPTION

Figure 1:
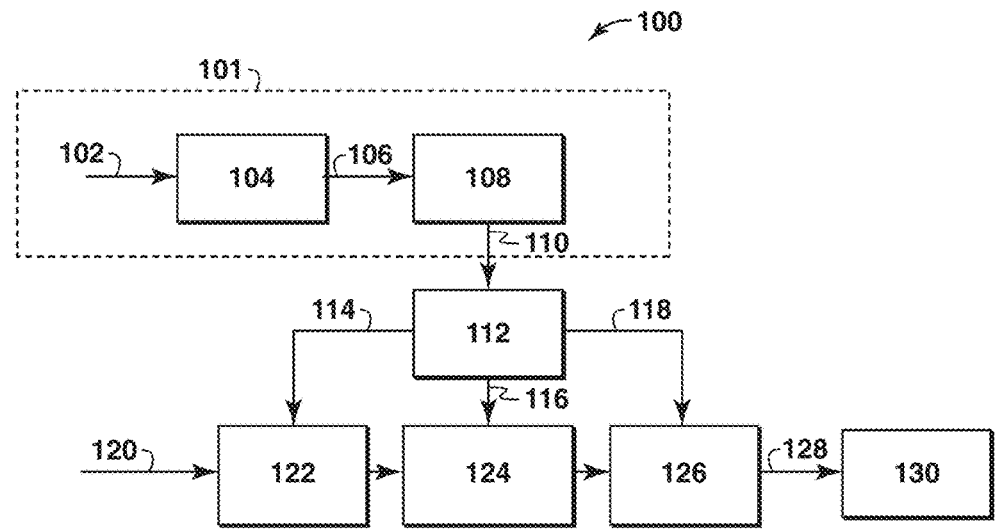
FIG. 1 is an illustration of a conventional system to prepare a seal gas from a gaseous feed stream.

In the following detailed description and example, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The term "structured adsorbent bed," as used herein means a volume of adsorbent materials that have a structural relationship to each other, wherein the structural relationship is maintained even when the materials are not contained in a vessel. The term excludes a bed comprising adsorbent particles simply dumped into a vessel. Exemplary structural relationships include, for example, a monolithic "brick," layered surfaces, channeled monoliths, and the like. Structured adsorbents contain at least a selective adsorbent material and a plurality of substantially parallel flow channels. The selective adsorbent material is comprised of high surface area solids and excludes polymeric or inorganic material. However, the structured adsorbent bed may also include a "binder" to hold adsorbent particles together. This binder may be a polymeric or inorganic material. The structured adsorbent bed may also contain a material that acts as a thermal mass serving to limit the temperature rise of the structured adsorbent bed when molecules are selectively adsorbed.

The term "selective component removal system (SCRS)," as used herein, means a system or group of components configured to have a selectivity of a first component greater than a second component (one of the components typically being a gaseous component), for example, a higher adsorption of oil than of methane. The SCRS may include any means of selectivity, unless particularly specified and may include compressors, filters, and other equipment specifically related to the selective removal of the first component from the second component.

The term "high surface area solid," as used herein means a volume of solids consisting essentially of mesoporous solids and microporous solids.

The term "kinetic swing adsorption process" includes processes such as pressure swing adsorption (PSA), thermal swing adsorption (TSA), calcination, and partial pressure swing or displacement purge adsorption (PPSA), including combinations of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA). The term swing adsorption also includes these rapid cycle processes. Some examples of swing adsorption processes and their application to natural gas separations are provided in U.S. Ser. No. 60/930,827, U.S. Ser. No. 60/930,826, U.S. Ser. No. 60/931,000, and U.S. Ser. No. 60/930,993, and U.S. Ser. No. 60/930,998, which are hereby incorporated by reference.

Pressure swing adsorption (PSA) processes operate on the principal that under pressure gasses tend to be adsorbed within the pore structure of microporous or mesoporous adsorbent materials or within the free volume of polymeric materials. The higher the pressure, the more gas is adsorbed. When the pressure is reduced, the gas is released, or desorbed. PSA processes can be used to separate gasses in a mixture because different gasses tend to fill the micropore or free volume of the adsorbent to different extents. If a gas mixture, such as natural gas, for example, is passed under pressure through a vessel containing polymeric or microporous adsorbent that fills with more nitrogen than methane, part or all of the nitrogen will stay in the sorbent bed, and the gas coming out of the vessel will be enriched in methane. When the bed reaches the end of its capacity to adsorb nitrogen, it can be regenerated by reducing the pressure, thereby releasing the adsorbed nitrogen. It is then ready for another cycle.

Temperature swing adsorption (TSA) processes operate on the same principle as PSA processes. When the temperature of the adsorbent is increased, the gas is released, or desorbed. By cyclically swinging the temperature of adsorbent beds, TSA processes can be used to separate gases in a mixture when used with an adsorbent that selectively picks up one or more of the components in the gas mixture.

Rapid cycle pressure swing adsorption (RCPSA) can be constructed with a dynamic (e.g. rotary) valving system to conduct the gas flow through a rotary adsorber module that contains a number of separate adsorbent bed compartments or "tubes," each of which is successively cycled through the sorption and desorption steps as the rotary module completes the cycle of operations. The rotary sorber module is normally comprised of multiple tubes held between two seal plates on either end of the rotary sorber module wherein the seal plates are in contact with a stator comprised of separate manifolds wherein the inlet gas is conducted to the RCPSA tubes and the processed purified product gas and the tail gas exiting the RCPSA tubes are conducted away from the rotary sorber module. By suitable arrangement of the seal plates and manifolds, a number of individual compartments or tubes may pass through the characteristic steps of the complete cycle at any given time. In contrast, with conventional PSA, the flow and pressure variations, required for the RCPSA sorption/desorption cycle, changes in a number of separate increments on the order of seconds per cycle, which smoothes out the pressure and flow rate pulsations encountered by the compression and valving machinery. In this form, the RCPSA module includes valving elements angularly spaced around the circular path taken by the rotating sorption module so that each compartment is successively passed to a gas flow path in the appropriate direction and pressure to achieve one of the incremental pressure/flow direction steps in the complete RCPSA cycle.

The term "swing adsorption unit," as used herein, means a system including a structured adsorbent bed that is capable of undergoing at least an adsorption step and a regeneration step, wherein at least one of the temperature and pressure is varied (or "swung") over a significant change in magnitude (e.g. from a low value to a high value). In certain embodiments, the swing adsorption unit may conduct one of the swing adsorption protocols (PSA, RCPSA, TSA, RCTSA, PPSA, RCPPSA, and combinations of these).

To prepare a gaseous feed stream for use in utilities such as dry gas seal (DGC) compressors, classes of separation applications that must be performed include dew point control, sweetening/detoxification, corrosion protection/control, dehydration, heating value, conditioning, and purification. A few examples of utilities that encompass one or more classes of applications are generation of fuel gas, seal gas, non-potable water, blanket gas, instrument and control gas, refrigerant, inert gas, and hydrocarbon recovery.

The present invention relates to swing adsorption units and processes for removing oil from seal gas to prevent condensation across the seal face and cause premature failure of standard dry seal compressors. Swing adsorption units contain a structured adsorbent bed. During the adsorption cycle, an selective adsorbent material in the swing adsorption bed removes entrained oil droplets and vapor from the high pressure seal gas. Materials that are suitable selective adsorbent material include high surface area solids such as alumina, mesoporous, or microporous solids. A binder, filler, heat adsorbing material, or combinations of these may also be incorporated with the selective adsorbent material. To enhance the efficiency of the adsorption and meet seal gas purity requirements it is preferred that the selective adsorbent material ("adsorbent") be incorporated as a structured adsorbent bed. Structured adsorbents useable with the present invention may be formatted as parallel channel contactors or as a "soot-filter" like monolith or combinations of these. These structures contain a multitude of substantially parallel flow channels surrounded by selective adsorbent material. Before an adsorption front breaks through to the end of the structured adsorbent bed a regeneration cycle is initiated. Because the oil is strongly adsorbed (e.g. a high ratio of selectivity for oil over the carrier fluid, which may be natural gas), preferred regeneration techniques involve heating the adsorbent, passing a purge material through the adsorbent that displaces the adsorbed oil, and calcination.

If the structured adsorbent bed is thermally regenerated or calcined, it is possible to incorporate a heater and heat exchanger so that hot gas does not pass through the valves controlling flow into and out of the structured adsorbent bed. In many instances this arrangement can be advantageous because several high pressure valves contain elastomeric seals or components that cannot be operated at temperatures in excess of approximately 250 degrees Celsius (° C.).

Cylinder oils act as lubricants for independently lubricated cylinders, such as reciprocating compressors. Cylinder oils lubricate valves, the piston ring/cylinder liner wall interface and provide a dynamic gas seal. Cylinder oils are available in a range of grades with different viscosities, viscosity index (i.e. temperature dependent viscosity) and additive packages that reduce friction, reduce corrosion, disperse colloidal materials, and reduce oxidation. It is preferred that the viscosity of the cylinder oil at 40° C. as determined by ASTM test method D445/446 be in a range from 75 to 300 CSt and the viscosity at 100° C. be in a range from 15 to 60 CSt. It is preferred that the ISO viscosity grade as determined by ISO test method 3448 be in a range from 70 to 300. It is also desired that the viscosity index as determined by ASTM D2270 be in a range from 215 to 250. The base stock from which the cylinder oil is formulated may be natural (i e mineral), synthetic, or a blend of natural and synthetic materials. An example of a cylinder oil that is a blend of natural and synthetic materials is an oil formulated from a mineral oil base stock with an oligomeric polyisobutylene viscosifying agent.

In a preferred embodiment, the cylinder oil is a synthetic composed of a random copolymer of ethylene oxide and propylene oxide. These ethylene oxide/propylene oxide random copolymers are often referred to as polyglycols and have solubility in cold water. In a more preferred embodiment the average molecular weight of the polyglocol as determined by gel permeation chromatography is in a range between 500 gram/mole and 10,000 gram/mole. In an even more preferred embodiment the average molecular weight of the polyglocol as determined by gel permeation chromatography is in a range between 1,200 gram/mole and 2,500 gram/mole.

Although many types of oil may be utilized in the present invention, it is preferred to use low ash or ash free cylinder oil. Ash content of the oil can be assessed by burning the oil and weighing the residue, for example by thermo gravimetric analysis (TGA). A low ash oil is taken to be one which has a residue after full oxidation (or burning) of less than 0.5 weight percent (wt %) of the formulated cylinder oil and in a preferred embodiment the ash content is less than 0.01 wt % of the formulated cylinder oil. An example of a synthetic cylinder oil with an ash content less than 0.01 wt % is an oligomer of ethylene and propylene oxide.

Referring now to the figures, FIG. 1 is an illustration of a conventional system to prepare a seal gas from a gaseous feed stream. The system 100 includes a selective component removal system (SCRS) 101 with a low pressure gas stream 102 as an inlet gas, a seal gas compressor 104 to produce a pressurized seal gas stream 106 for a filter unit 108 (e.g. a coalescing filter) to produce a filtered seal gas stream 110 as an outlet gas. The filtered seal gas stream 110 is sent to a seal gas control panel 112, which separates the stream 110 into low pressure seal gas 114, medium pressure seal gas 116, and high pressure seal gas 118. The system 100 further includes a sour process gas stream 120 fed into a low pressure sour gas injection compressor 122, medium pressure sour gas injection compressor 124, and high pressure sour gas injection compressor 126, which produces a pressurized sour gas stream 128 to injection wells 130. The injection compressors 122, 124, and 126 operate using the low, medium, and high pressure seal gasses 114, 116, 118, respectively.

Low pressure (LP) stream 102 may have pressures below about 800 pounds per square inch absolute (psia), while pressurized stream 106 may have pressures above about 1,500 psia up to about 3,500 psia. The LP gas stream 102 may have a variety of component percentages. In one exemplary embodiment, LP stream 102 is a fuel gas stream substantially comprising methane (e.g. from about 60 mol % to about 90 mol %), other light hydrocarbon components (e.g. ethane, propane, butane, etc.), and nitrogen, but also including very low amounts of "contaminants" such as water, carbon dioxide, and hydrogen sulfide (e.g. from about 0 mol % to about 0.001 mol %). In other embodiments, the LP stream 102 may be a treated slip stream from the sour process gas stream 120, a high purity nitrogen stream, or some other gaseous stream having low contaminant content. Pressurized stream 106 has substantially the same composition as LP stream 102, but additionally including oil vapor and droplets (e.g. mist).

Coalescing filters 108 can only remove the mist and cannot significantly reduce the vapor saturation of oil in the gas stream. Thus, when the oil saturated gas stream 110 passes across the seal face (in the compressor 122, 124, or 126) some amount of liquid (oil) will drop out. As such, even with a perfect coalescing filter 108 some amount of liquid will drop out in the seal and the compressor 122, 124, or 126 will not properly operate as a dry seal compressor. Particularly at high pressures, the operation of coalescing filters can be far from ideal and a portion of the oil mist is expected to pass through the filter into the seal of the compressor. The amount of liquid oil entering the seals is expected to be much greater than the amount carried as vapor. These amounts can be sufficient to increase the friction in the seals causing wear and premature failure of the seals.

Figure 2:
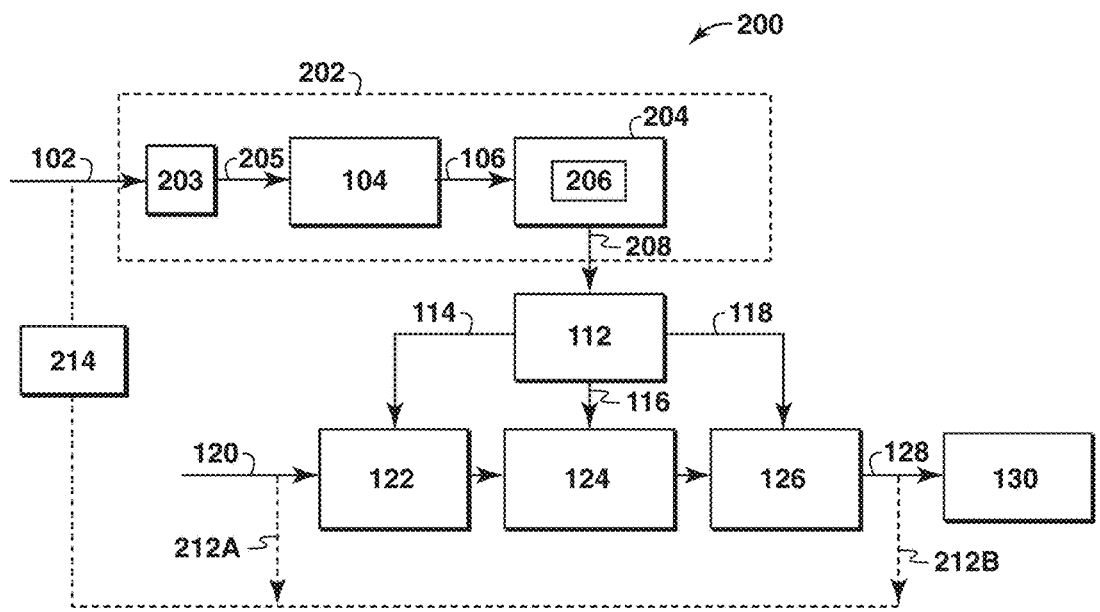
FIG. 2 is an illustration of a selective component removal system to prepare a seal gas from a gaseous feed stream in accordance with the present invention.

FIG. 2 is an illustration of a selective component removal system to prepare a seal gas from a gaseous feed stream in accordance with the present invention. Functionally equivalent components of system 100 and system 200 are given the same reference numbers for convenience. The selective component removal system (SCRS) 202 includes a low pressure gas stream 102 as an inlet gas, a seal gas compressor 104 to produce a pressurized seal gas stream 106 for a swing adsorption unit 204 having a structured adsorbent bed 206 to produce a substantially oil-free seal gas stream 208 as an outlet gas. For use with the present invention, it is preferred that the composition of the low pressure stream 102 be such that components in the stream do not drop out as liquids when it is pressurized and expands across the seal faces.

To determine if a component will drop out as a liquid, a phase envelope for the fuel gas composition may be calculated. This calculation is performed using generally accepted equations of state such as the Peng-Robinson equation. Also, the gas composition modeled should not include any compressor oil that is picked-up from the seal gas compressor 104. An exemplary commercial software package that can be used to predict this phase envelope is Hysys 2004.1 available from Aspen Technology. This phase envelope can be displayed as a plot with pressure on the y axis and enthalpy on the x-axis. Expansion across the seal faces is taken to be similar in behavior to a valve expansion and is a vertical line on such a plot. The x-axis intercept of the vertical line is the molar enthalpy of the compressed fuel gas at the temperature and pressure it is utilized as a seal gas. As long as the composition along the vertical line is entirely gaseous and the line does not cross through a two phase region, then the low pressure stream has a composition suitable for use.

If the expansion enters a two phase region, then the low pressure stream 102 must be conditioned before it can be used in the process. In this case, an optional conditioning unit 203 is utilized to condition the low pressure process stream 102 to produce a conditioned gas stream 205 to feed to the compressor 104. This conditioning unit 203 removes condensable components so that a two phase region is not encountered when the gas expands across the seal faces. In one example, if the low pressure process stream 102 is a fuel gas containing excessive amounts of heavy hydrocarbons then a conditioning unit 203 containing a heavy hydrocarbon removal apparatus is utilized to form the conditioned gas stream 205. Heavy hydrocarbon removal apparatuses include adsorption units or a cooling unit to induce gas/liquid phase separation. In another example, the low pressure process stream 102 is a fuel gas nearly saturated with water. In this case conditioning unit 203 is configured to remove water with devices such as thermal swing adsorbers or glycol dehydrators. A more specific example of the phase envelope is provided in connection with FIG. 7 below.

The swing adsorption unit 204 and adsorbent bed 206 are configured to remove at least a portion of the oil mist and the oil vapor from the gas 106 so that it will not condense and cause premature failure of dry seal compressors 122, 124, 126. The structured adsorbent bed 206 may be a packed bed, structured adsorbent, a structured adsorbent contactor or a contactor containing an adsorbent. The structured adsorbent bed 206 is regenerated in a swing adsorption process.

Although the SCRS 202 may be used in a system similar to the system 100, it may be used in any system for removing oil from a gaseous stream for use in a dry seal compressor. In one specific embodiment, the system may integrate an accumulator with the seal gas control panel 112 or replace the control panel 112 with an accumulator. Further, any number and combination of dry seal compressors 122, 124, and 126 may be used, including any combination of low, medium, and high pressure gas streams 114, 116, and 118. In yet another embodiment, the dry seal compressors 122, 124, 126 may be used to compress a substantial carbon dioxide stream for enhanced oil recovery or sequestration. Note, that compressors 122, 124, and 126 may be any device or group of devices that utilize a dry gas stream to operate and includes at least a compressor, a compressor string, a turbo-expander compressor, a turbo-expander generator, a pump, a fired steam boiler, a fired process heater, a gas engine, a hermetically sealed direct-drive electric motor, turbomachinery equipped with magnetic bearings, and a gas turbine.

As discussed above, the inlet gas stream 102 may include numerous compositions and be supplied from a variety of sources. For example, the inlet gas stream 102 may include at least one hydrocarbon component. When the inlet gas stream 102 contains natural gas or associated gas, a product stream may be produced. Such a product stream is at least a purified gas stream that is transferred to market by pipeline, or a liquefied natural gas, or natural gas liquids, or a gas stream that is injected into the subsurface in locations such as the producing field, an underground aquifer, another geological formation, or a combination of these different products and locations. In one alternative embodiment, a slip stream 212A or 212B is provided from the gaseous stream 120 or the injection stream 128, respectively, directed to a filtering unit 214, and fed to the inlet stream 102 for cleanup and use as a dry gas seal stream 114, 116, or 118.

In high pressure applications such as injection operations, it is preferable to operate the swing adsorption unit 204 with an inlet stream 106 in a range from at least about 100 bar to at least about 500 bar and more preferably in a range from about 200 to about 400 bar, and even more preferably in a range from about 250 bar to at least about 350 bar which is dependent on the compressor suction or sealing pressure. These pressures are in excess of those used in conventional swing adsorption units.

Figure 3:
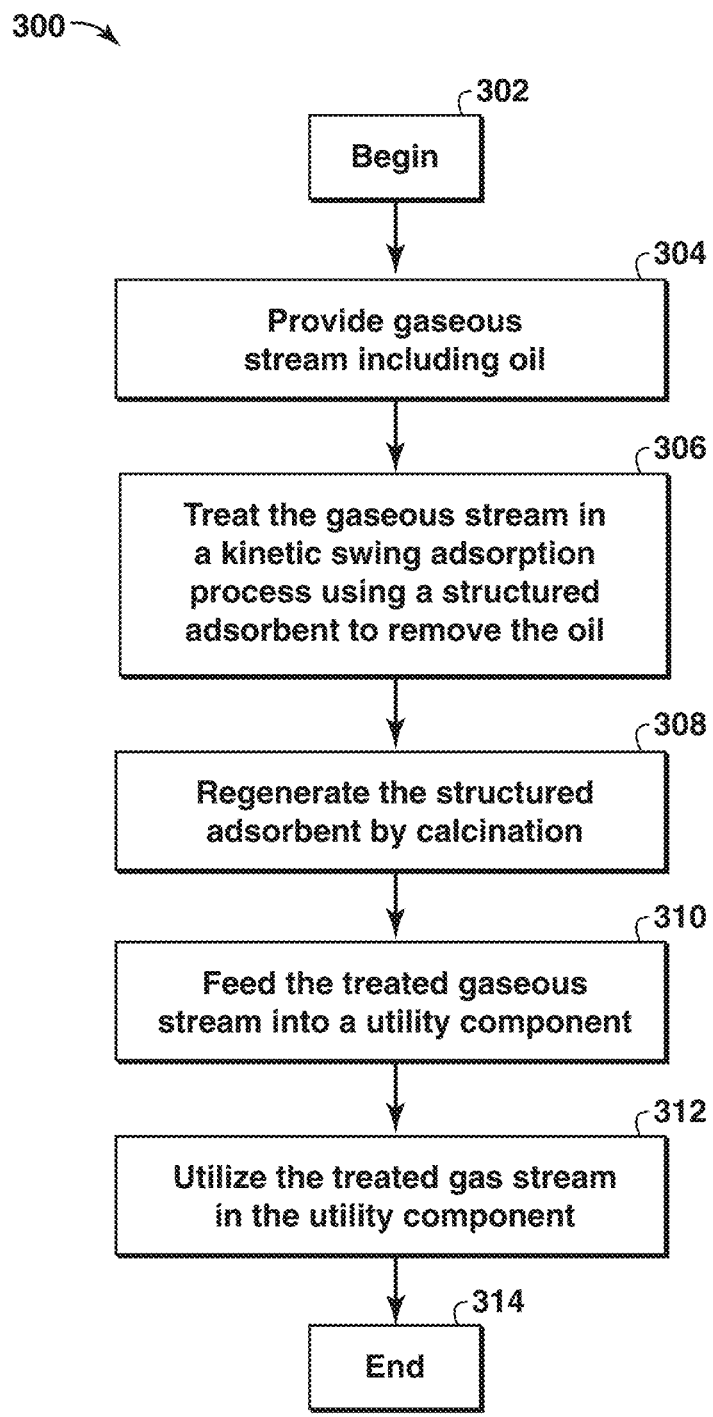
FIG. 3 is a flow chart of a process to prepare a seal gas from a gaseous feed stream using the system of FIG. 2.

FIG. 3 is a flow chart of a process to prepare a seal gas from a gaseous feed stream using the system of FIG. 2. As such, FIG. 3 may be best understood with reference to FIG. 2. The method 300 starts at block 302 and further includes providing 304 a gaseous stream including oil 106, treating 306 the gaseous feed stream 106 in a swing adsorption process unit 204 using a structured adsorbent bed 206 to remove at least a portion of the volume of oil, regenerating 308 the structured adsorbent bed 206 in a calcination process to produce a utility gas stream 210, feeding 310 the utility gas stream 210 to a utility component (e.g. compressors 122, 124, or 126), and utilizing 312 the treated gas stream 210 in the utility component (e.g. as a dry seal gas in a dry seal compressor). The process 300 ends at block 314.

In the adsorption process 306 the gaseous feed 102 (or 105) is passed through a bed of solid adsorbent material 206. Exemplary suitable adsorbent materials for this process may be a packed bed, structured adsorbent, a structured adsorbent contactor or a contactor containing an adsorbent. Molecules in the feed 102 adsorb on the solid adsorbent material. Components of the gaseous feed that are more strongly adsorbed are removed from the stream, or at least their concentration decreases significantly below their initial concentration in the gaseous feed.

In the case when fuel gas or sour gas is used as a source of dry seal gas, oil is the most strongly adsorbed component owing to its higher molecular weight and stronger interactions with solid adsorbent materials as compared to lighter components in the gaseous feed such as methane, ethane, $N_2$, $CO_2$ and $H_2S$. Both oil vapor and entrained droplets are adsorbed on the solid adsorbent materials. Thus, in the adsorption process, most of the oil is effectively removed from the stream of lighter components to provide a substantially oil-free gaseous outlet stream. Adsorption processes can be performed in a non-equilibrium regime which exploits the difference in diffusion times between small and large molecules. Small components in the gaseous input stream diffuse faster than bulkier oil molecules. This results in effective removal of oil from the outlet stream. Adsorption is an exothermic process, and desorption or regeneration of solid adsorbent material may include a temperature swing process, high-temperature calcination, a pressure swing process, an inert purge, or any combination thereof. These kinetic swing adsorption/desorption processes can be conducted with rapid cycles.

Figure 4:
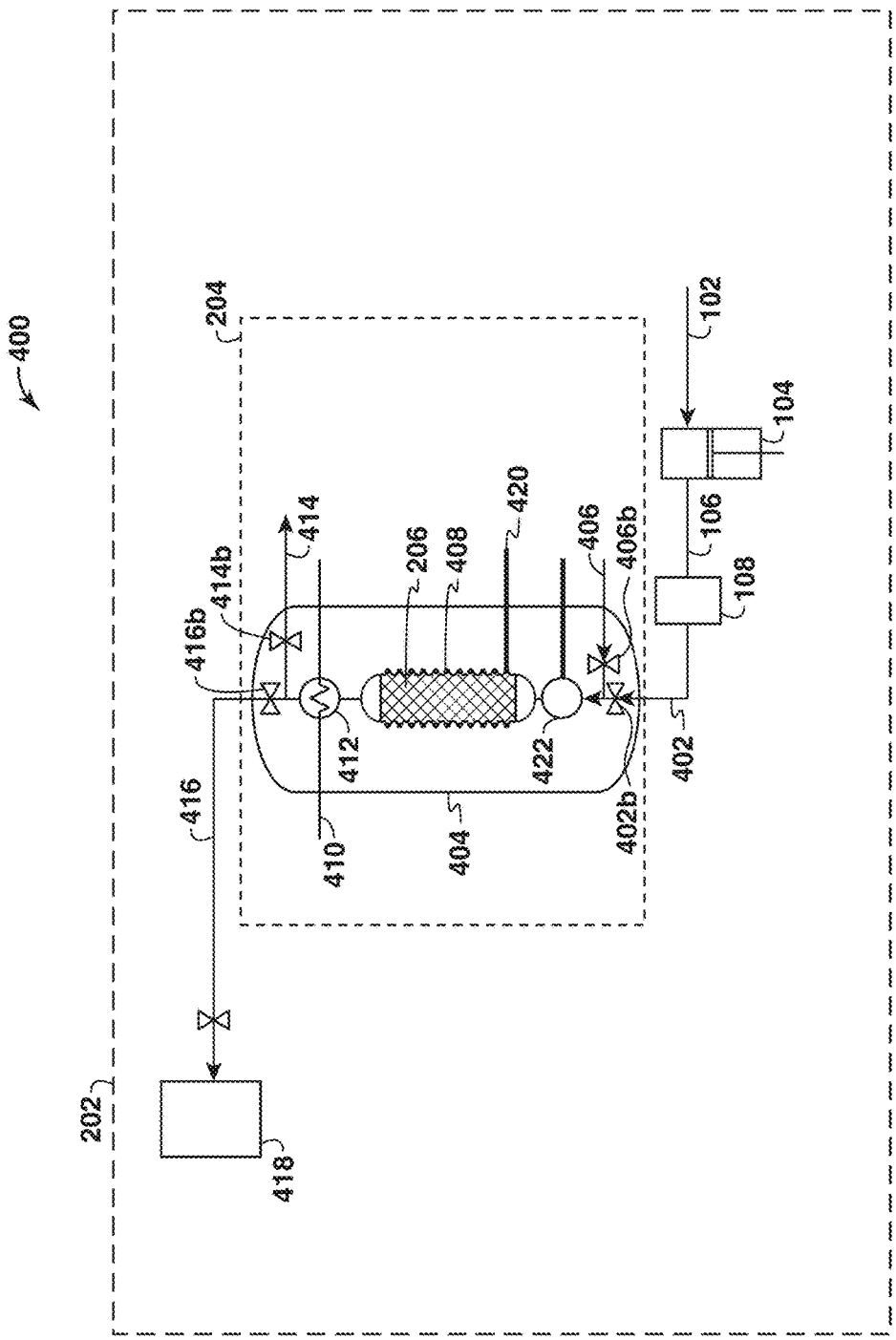
FIG. 4 illustrates an exemplary embodiment of a process schematic of the SCRS of FIG. 2 operated according to the method of FIG. 3.

FIG. 4 illustrates an exemplary embodiment of a process schematic of the SCRS of FIG. 2 operated according to the method of FIG. 3. As such, FIG. 4 may be best understood with reference to FIGS. 2 and 3. The system 400 includes a selective component removal system 202 having a kinetic swing adsorption unit 204, a gas inlet stream 102, a reciprocating compressor 104 that produces a pressurized gaseous stream 106 to an optional filter 108, which produces an inlet gas stream 402 through inlet valve 402b for the swing adsorption unit (SAU) 204. Note that, although a conditioning unit 203 is not shown, such a unit is an optional feature. The SAU 204 includes a housing 404, a gaseous purge stream inlet 406 with purge inlet valve 406b, a structured adsorbent bed 206 with a heater 408 configured to heat the bed 206 for regeneration 308. The SAU 204 further includes a cooling fluid 410, an outlet heat exchanger 412, a vent stream outlet 414 and valve 414b, a utility gas stream outlet 416 and valve 416b.

The SCRS 202 may further include optional features such as a cooling jacket 420, an electric pre-heater 422 and an accumulator 418. In one embodiment, the inlet gas stream 106 may be directed through the filter 108 and control valve 402b into the adsorption unit 204. The filter 108 may remove any extraneous particles that could contaminate and deactivate the adsorbent bed 206 and may be a coalescing or particulate filter. The control valves 402b and 406b may regulate the flow of fluids fed into the SAU 204. The streams may be connected by tubulars, which may be constructed from corrosion resistant alloys, carbon steel, or other materials, but preferably the tubulars are capable of handling fluids at high pressure, such as above about 100 bar.

In one exemplary embodiment of the SCRS 202, the SAU 204 is a thermal swing adsorption unit, where inlet gas 102 is treated 306 by feeding it into the adsorption bed 206 where contaminants such as the oil are adsorbed onto the bed 206. In the regeneration step 308, the swing adsorption cycle depressurizes the bed 206 and thermally swings the bed 206 to a temperature sufficient for calcination (e.g. from at least about 250° C. to about 500° C.) with the bed heater 408, and flows a low pressure air stream from purge inlet 406, or some combination thereof. After the calcination is complete, the bed 206 is cooled and repressurized before another adsorption step 306 is begun. Cooling can be accomplished with either an optional water cooling jacket 420 or by flowing inlet gas 402 (either low pressure or pressurized) through the bed 206, or by flowing cooling fluid through separate heating/cooling channels in a bed configured as a contactor 206. After cooling, the bed 206 is ready to receive another charge of inlet gas 402 having oil vapor and droplets.

Additionally, the heat exchanger 412 is configured to utilize cooling fluid 410 to reduce the temperature of hot gas 416 coming out of the swing adsorption unit 204 to a sufficiently low temperature that it can be passed through the valve 416b. Optionally, the selective component removal system (SCRS) 202 may contain a filter (not shown) downstream to catch dust or particulates that may come out of the structured adsorbent bed 206.

The exit gas stream 416 may be directed to an accumulator 418 and/or a gas control panel 112 to regulate the flow of utility or seal gas 114, 116, and 118 to utility components or dry gas seal compressors 122, 124, and 126.

The choice of valve technologies depends in part on the pressure, composition, and temperature of the inlet stream 402 or 106, and the temperature of any required heating or cooling fluids (e.g. 410). In all cases, the valves 402b, 406b, 414b, and 416b have a sealing surface or packing that prevents leakage of components out of the valve body. The amount of leakage out of the valve body depends on the differential pressure between the atmosphere surrounding the valve and the stream or streams controlled by the valve. When the feed stream is fed at high pressures (e.g., greater than 70 bar) the leakage rate from the valves can be an important safety and operational concern. For example, if the adsorption unit 204 processes $H_2S$ containing sour or acid gas even small amounts of leakage can be a significant safety and operational concern. In one exemplary embodiment of the present invention, valve or valve sets 402b, 406b, 414b, and 416b are enclosed in individual housings pressurized to a pressure greater than 10% of the feed stream 402 or 106 pressure and in a more preferred embodiment the housings are pressurized to a pressure greater than 90% of the feed stream 402 or 106 pressure. There may also be sensors to detect any potential release of $H_2S$, which can present a safety hazard.

In an exemplary embodiment, the swing adsorption unit 204 contains multiple adsorption beds 206A-206X (only one shown). Preferably, at least a portion of the beds 206A-206X will be undergoing regeneration 308, while others are undergoing the adsorption step 306. One example of a multiple-bed pressure swing adsorption configuration and method is provided in U.S. Pat. No. 7,276,107, which is hereby incorporated by reference for teachings regarding multiple bed pressure swing adsorption (PSA) systems. The system and steps of the PSA approach are slightly modified for a temperature swing approach. An example of a unit with multiple adsorption beds 206A-206X is one that processes 5-10 $10^6$ standard cubic feet per day (SCFD) of pressurized (e.g. about 330 bar) fuel, nitrogen or other essentially oxygen free gasses.

In one exemplary design for a swing adsorption unit 204 having multiple structured adsorbent beds 206A-206X, each structured adsorbent bed is contained inside a single tube about four meters long, having about a two inch diameter, wherein the swing adsorption unit 204 contains six such tubes. Each tube has its own control valves 402b, 406b, 414b, 416b, heater 408, cooling jacket 420 and heat exchanger 412. The adsorption step 306 may be carried out for about 6 hours and the total time for depressurization, regeneration, bed cooling, and repressurization may be about 6 hours. During the adsorption step 306 the gas residence time in the adsorbent bed is between about 0.1 and about 100 seconds, preferably between 0.5-2 seconds.

After the high pressure (330 bar) adsorption step 306 the bed 206 is depressurized to 1-20 atmospheres and preferably 1-2 atmospheres. Air or pressurized air 406 is then introduced and the structured adsorbent bed 206 is electrically heated to about 350° C. with the heater 408 wrapped around the outside of the tube. An internal heater could also be used and it is also possible to preheat the air 406 in preheater 422 before it enters the bed 206. The hot air 406 will calcine the oil adsorbed on the structured adsorbent, converting it to a gaseous $CO_2$ stream, and in some cases other gaseous products such as CO. The hot exit gas 416 leaves the adsorbent bed 206, which is cooled by a heat exchanger 412 before reaching the outlet valve 416b. After calcination 308 the bed 206 is cooled and purged with nitrogen before repressurization with inlet gas 402.

In one exemplary embodiment, the calcination process is designed so that a thermal or calcination wave advances through the structured adsorbent bed 206. A thermal wave is taken to be a sharp temperature gradient or thermal front that moves through the contactor or adsorbent bed during the regeneration step. The speed at which the thermal front (i.e. region with sharp temperature gradient) moves is referred to as the velocity of the thermal wave which does not have to be constant. One exemplary method of introducing a thermal wave into a calcination process is to heat only the beginning of the bed 206 or contactor to a temperature such that a calcination reaction proceeds to remove adsorbed oil. This can be accomplished by passing hot air into the bed or contactor at a rate such that it rapidly transfers heat to the bed or contactor and thermally equilibrates with the mass of the bed or contactor. An alternative exemplary method includes externally heating only the adsorbent at the beginning of the bed 206. Once the calcination reaction has ignited, the released heat is carried down the bed 206 or contactor allowing a sharp reaction front to proceed through the bed 206 or contactor. In this manner, the oil in the adsorbent calcines (e.g. burns) in a front. Such a front is similar in nature to the reaction front that passes through a lit cigar. Several different alternative regeneration methods may also be employed. These include thermally swinging the adsorbent bed 206 to desorb the oil as well as displacing the oil with a purge gas or washing media. It is possible to conduct the oil displacement at high pressures and in some designs the thermal desorption could occur at high pressure. In all cases the regeneration step 308 follows an adsorption step 306.

Examples of structured adsorbent materials that may be used in the structured adsorbent bed 206 include high surface area (greater than about 10 square meters per gram ($m^2$/gm) and preferably greater than 75 $m^2$/gm) solids such as alumina titania or zirconia, microporous zeolites (preferably zeolites with particle sizes less than about 1 micron (μm)), other microporous materials, mesoporous materials, ordered mesoporous materials, and layered solids with intercalating properties such as clays, layered silicates and layered oxides. Non-limiting examples of these materials include carbons, activated carbons, charcoal, cationic zeolites, high silica zeolites, highly siliceous ordered mesoporous materials, sol gel materials, aluminophosphates (ALPO) materials (microporous and mesoporous materials containing predominantly aluminum phosphorous and oxygen), silicon aluminophosphates (SAPO) materials (microporous and mesoporous materials containing predominantly silicon aluminum phosphorous and oxygen), MOF materials (microporous and mesoporous materials comprised of a metal organic framework) and ZIF materials (microporous and mesoporous materials comprised of zeolitic imidazolate frameworks).

In one preferred embodiment, the zeolites are highly siliceous having 12 or 14 and higher membered rings in their framework structure. Highly siliceous zeolites are taken to be zeolites with a silicon to aluminum (Si/Al) ratio greater than 50:1, preferably greater than 200:1. Examples of such high silica molecular sieves having 12 membered rings in their framework include: Zeolite beta, BEC (beta polymorph C), EMT (hex faujasite), IFR (MCM-58), IWR (ITQ-24), IWV (ITQ-27), IWW (ITQ-22), MEI (ZSM-18), MOR (mordenie), MOZ (ZSM-10), MSE (MCM-68), MTW (ZSM-12), SFE (SSZ-48), SFO (SSZ-51), SSY (SSZ-60), VET (VPI-8) and ITQ-21. Examples of high silica molecular sieves having 14 and higher membered rings include: ETR (EST-34, Ga-silicate), CFI (CIT-5), DON (UTD-1), SFH (SSZ-53), SFN (SSZ-59), and UTL (IM-12). Ordered mesoporous materials are for example: the M41S family—MCM-41, MCM-48, MCM-50; SBA materials-15, 16, -11, -1 and MSU. Ordered mesoporous materials of the M41S family are especially suitable for oil adsorption from gaseous streams. More specifically, highly siliceous MCM-41 materials with uniform cylindrical channels of 4-10 nm in diameter and specific surface area of 100-1,500 m$^2$/g and the particle size in the range of 0.1-10 micron, preferably less than 1 micron, are expected to have favorable adsorption properties for oil vapor and droplets. Highly siliceous molecular sieves have an oil adsorption isotherm that is expected to be very strong at temperatures below about 100° C., even when the oil is carried in a gas stream at pressures in excess of about 300 bar.

In one preferred embodiment, the structured adsorbent bed 206 includes ordered mesoporous materials. Examples of ordered mesoporous materials include the M41S family of materials, SBA materials, MSU materials, and mesoporous materials derived from layered silicates such as kanemite, carbon replicas of mesoporous materials, and organo-inorganic mesoporous composites. A description of these types of ordered mesoporous materials is given in "Studies in Surface Science and Catalysis" Vol. 148 (Elsevier 2004), the portions of which providing examples of ordered mesoporous materials are hereby incorporated by reference.

In an exemplary embodiment, the adsorbent bed 206 contains a material selected from the M41S family of materials (e.g. MCM-41, MCM-48, and MCM-50). These materials are preferred because they are readily synthesized, are thermally stable to temperatures greater than 500° C., and contain well defined uniform pore sizes that can be tailored in a range from about 20 to 100 angstroms ($10^{-10}$ m). This thermal stability reduces the amount of degradation of the adsorbent during a calcination process that may be used to regenerate the adsorbent. The Si/Al ratio of the M41S family materials can be in a range from 5:1 to 100,000:1 (effectively aluminum free). It is preferred to use materials from the M41S family with a large Si/Al ratio (e.g. greater than about 200:1). Channel systems in these materials may be uni-dimensional (e.g. MCM-41) or three-dimensional (e.g. MCM-48). Materials with either uni-dimensional or three-dimensional channels can be used in the adsorbent bed 206. The SBA materials (e.g., SBA-15, 16, -11, -1) are also thermally stable to temperatures greater than 500° C. as well as MSU materials, and mesoporous material derived from layered silicates such as kanemite. Organo-inorganic mesoporous composites are less preferred when a high temperature calcination process is used to regenerate the adsorbent.

In another preferred embodiment, a low acidity microporous or mesoporous material such as alumina, high silica molecular sieves, and highly siliceous mesoporous materials may be used. One of the reasons that alumina, high silica molecular sieves, and highly siliceous mesoporous materials are preferred for use in a swing adsorption system 204 that removes oil is that they have low acidity and have less of a tendency to crack and coke adsorbed oil if the swing adsorption unit is heated during a thermal regeneration or calcinations step 308.

It should be noted that the materials described above generally have pore sizes less than about 10 nm (100 Angstrom (Å)) and all of the materials have pore sizes greater than about 0.4 nm (4 Å). As such, it is preferred to conduct this process with a structured adsorbent material that has a pore structure in the 0.4 to 10 nm range. In one preferred embodiment, the pore structure for the adsorbent material is in 0.5 to 100 nm range and in an even more preferred embodiment the pore structure is in the 0.5 to 90 nm range. All of these adsorbent materials have a selectivity greater than 1 with respect to methane for heavy hydrocarbons (hydrocarbons containing more than two carbon atoms).

The swing adsorption unit 204 preferably contains an adsorbent bed 206 containing either beaded or pelletized adsorbent particles, a structured adsorbent formed as a parallel channel contactor, an adsorbent that is formed as a structured flow through adsorbent, or combinations of these. The physical architecture of the adsorbent bed or contactor 206 used depends on whether the contactor is internally heated or externally heated during the regeneration process. With internally heated beds or contactors, the gas or fluid used to heat the contactor during the regeneration step directly contacts the adsorbent material. As such, the gas or fluid used to heat the bed or contactor during regeneration passes through the same macropore volume that the compressed gas stream 106 did during the adsorption step. The gas or fluid used to heat and regenerate the adsorbent can flow co-current, counter-current or orthogonal (i.e., cross-flow) to the direction that the compressed gas stream 106 flowed during the adsorption step. Externally heated contactors have a separate set of channels to carry gasses or fluids used to heat and cool the contactor 206. In one preferable embodiment, the separate set of channels are sealed so that gasses used to heat and cool the contactor do not mix with the oil or reaction products liberated during the regeneration step 308.

In another preferred embodiment, the adsorbent bed 206 in the swing adsorption unit 204 is formed using a parallel channel (or parallel passage) contactor with a structured adsorbent. In a parallel channel contactor there exists at least one set of flow channels that are substantially parallel. The parallel channel (or parallel passage) contactor with a structured adsorbent allows for efficient mass transfer with a minimum of pressure drop. Efficient mass transfer between the gas stream and the adsorbent is extremely important to remove low concentrations of oil. Approaches to constructing parallel passage contactors with structured adsorbents have been disclosed in US2006/0169142, US2006/0048648, WO2006/074343, WO2006/017940, WO2005/070518, and WO2005/032694.

Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. The adsorbent can be coated onto these geometric shapes or the shapes can, in many instances, be formed directly from the adsorbent material, or combinations of the adsorbent material, a binder, and a material that limits the temperature change from the heat of adsorption.

An example of a geometric shape formed directly from the adsorbent would be the extrusion of a zeolite/polymer composite into a monolith. Another example of a geometric shape formed directly from the adsorbent would be extruded or spun hollow fibers made from a zeolite/polymer composite. An example of a geometric shape that is coated with the adsorbent is a thin flat steel sheet coated with a microporous, low mesopore, adsorbent film, such as a zeolite film. The directly formed or coated adsorbent layer can be itself structured into multiple layers of the same or different adsorbent materials. Multi-layered adsorbent sheet structures are taught in United States Patent Application Publication No. 2006/0169142, which is incorporated herein by reference. When parallel plates are used to form the parallel channel, a spacer may be present in the space of the parallel channel. An example of a spacer-less parallel passage contactor is provided in US2004/0197596 and an example of a parallel passage contactor with a high density adsorbent structure is given in US2005/0129952.

The parallel channel contactor also contains either a mesoprous or microporous adsorbent that is used to remove oil. The parallel channel contactor also contains both mesopores and macropores resulting from space between particles (adsorbent, binder particles, and heat control particles or materials) used to form the contactor. Mesopores and macropores are known in the art to improve the mass transfer characteristics of adsorbents used in either a parallel channel contactor or conventional packed bed contactors. Improvements in mass transfer characteristics from the presence of mesopores and macropores in conventional packed bed contactors have been widely discussed. See, for example U.S. Pat. Nos. 6,436,171 and 6,284,021. Improvements in mass transfer characteristics from the presence of mesopores and macropores in parallel channel contactors are discussed in EP1413348. The teaching in the field has been that a large number of mesopores and macropores are needed in an adsorbent particle or layer of adsorbent in order to have mass transfer characteristics good enough to operate a swing adsorption cycle. It is unexpected that adequate mass transfer characteristics can be attained without a significant amount of mesopores and/or macropores providing easy access to the micropore structure in the adsorbent where selective separation occurs.

However, it has recently been discovered that it is possible to construct parallel channel contactors that have good mass transfer characteristics along with a low volume of mesopores and macropores, as disclosed in the following applications: PCT App. Nos. PCT/US2008/06071; PCT/US2008/06076; PCT/US2008/06068; PCT/US2008/06073; and PCT/US2008/06067, which are hereby incorporated by reference.

The configuration of the structured adsorbent bed 206 also depends on the method used to regenerate the adsorbent. When the structured adsorbent is regenerated in a calcination or thermal swing process, heat may be supplied indirectly by a heater 408 or heat may be directly supplied by flowing a gas or fluid 402 or 406 through a preheater 422 through the structured adsorbent bed 206 or by directly electrically heating (not shown) a structured adsorbent bed 206 (formulated with appropriate electrical conductivity). If heat is electrically supplied (externally or internally) it can be advantageous to segment the heating element to facilitate the passage of a thermal wave along the length of the structured adsorbent bed 206. It is also possible to configure a parallel channel contactor with separate passages that allow heating and cooling fluids or gasses to flow so that they do not contact the adsorbent. For example, the parallel channel contactor can be configured like a shell and tube heat exchanger with the adsorbent coated on the tube walls of the heat exchanger. Another exemplary configuration includes a hollow fiber, spiral wound or monolithic contactor in the form of a membrane like module with an impermeable coating separating the heating and cooling passages from those carrying the gas being treated.

Figure 5A:
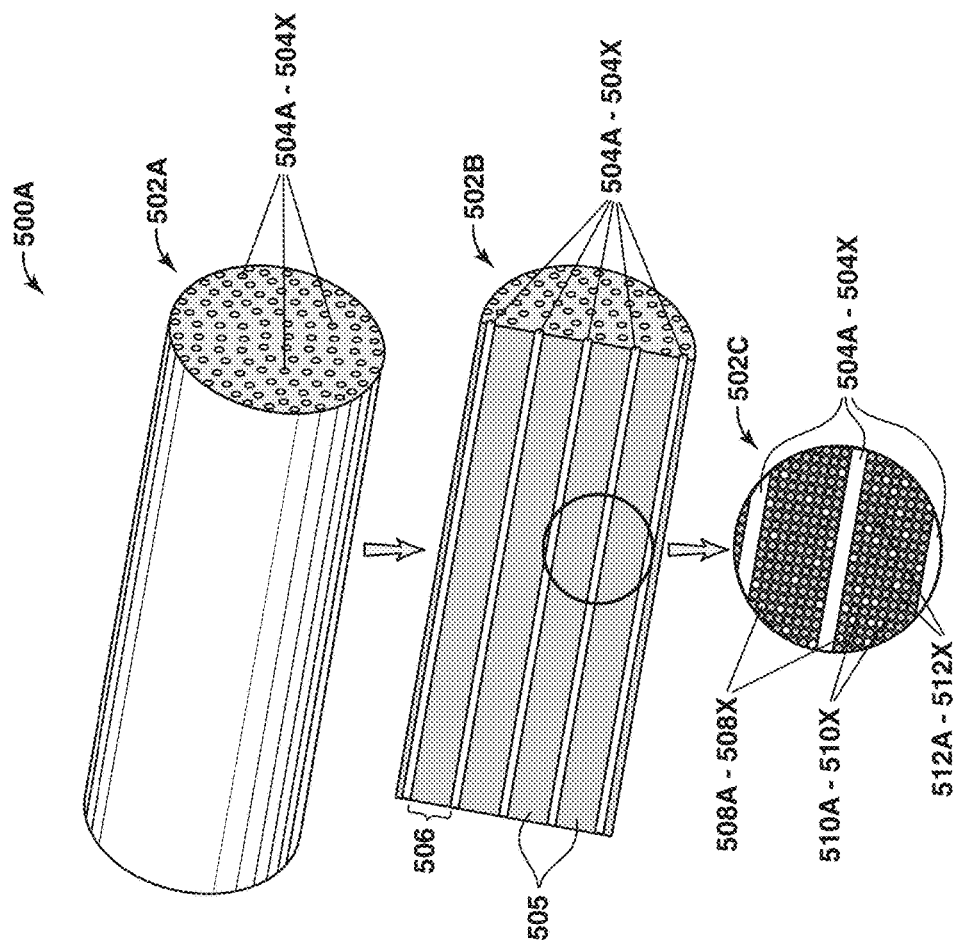
FIGS. 5A-5B illustrate exemplary embodiments of parallel channel contactor structured adsorbent bed designs for use in the system of FIGS. 2 and 4 and processes of FIG. 3.
Figure 5B:
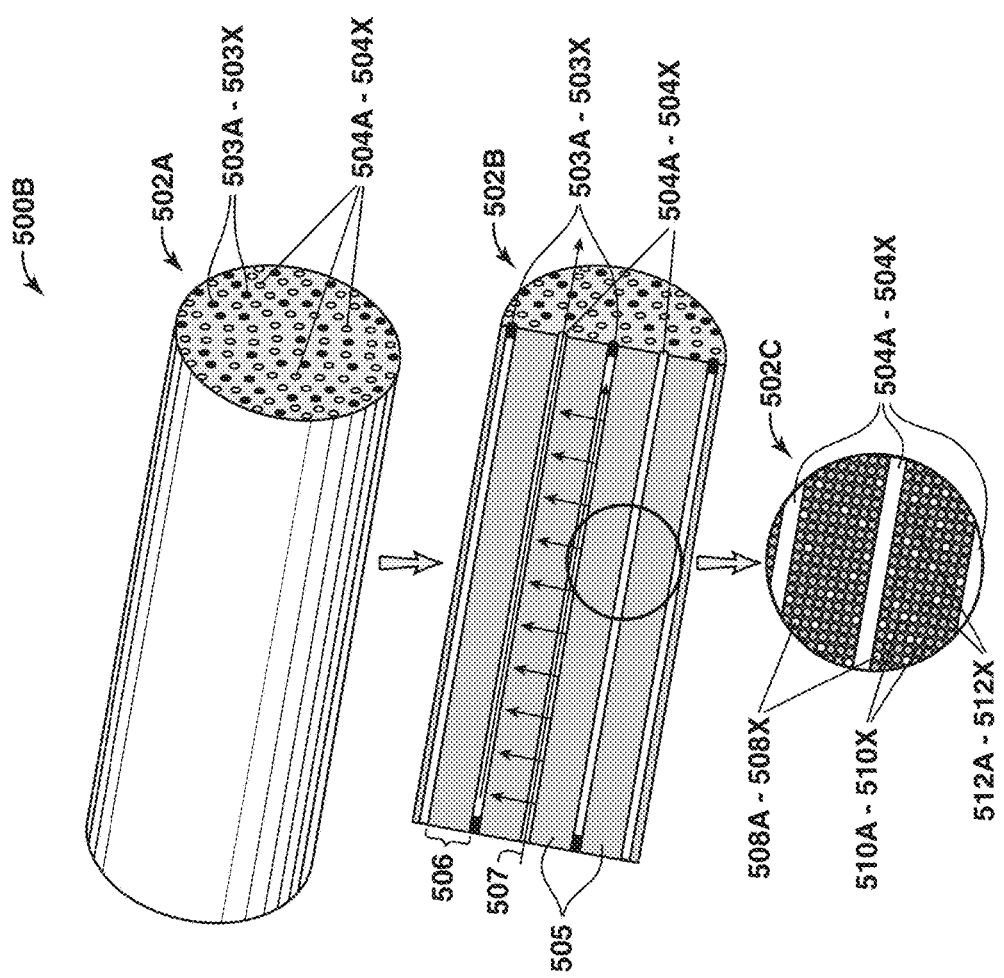

FIGS. 5A-5B illustrate exemplary embodiments of parallel channel contactor structured adsorbent bed designs for use in the system of FIGS. 2 and 4 and processes of FIG. 3. As such, FIGS. 5A-5B may be best understood with reference to FIGS. 2-4. FIG. 5A shows a monolithic parallel channel contactor 500A in an isometric view 502A, a cut-out view 502B, and a detail view 502C. The cylindrical monolith 500A contains a plurality of parallel flow channels 504A-504X. These flow channels 504A-504X (which may be cumulatively referred to as flow channels 504) can have diameters (channel gap) from about 5 to about 1,000 microns, preferably from about 50 to about 250 microns, as long as all channels 504 of a given contactor have substantially the same size channel gap. The channels can be formed having a variety of shapes including, but not limited to, round, square, triangular, and hexagonal. The space between the channels is occupied by the structured adsorbent 505. As shown the channels 504 occupy about 25% of the volume of the monolith 500A and the adsorbent 505 occupies about 75% of the volume of the monolith 500A. The adsorbent 505 can occupy from about 50% to about 98% of the volume of the monolith 500A. Adsorbent layer 506 thickness can also vary. For example, when the channel diameter is in a range from about 50 to about 250 microns it is preferred that the thickness of the adsorbent layer 506, in the case wherein the entire contactor is not comprised of the adsorbent, be in a range from about 25 to about 2,500 microns. For a 50 micron diameter channel, the preferred range of thickness for the adsorbent layer 506 is from about 25 to about 300 microns, more preferred range from about 50 to about 250 microns.

The cross-sectional view 502B along the longitudinal axis showing feed channels 504 extending through the length of the monolith with the walls of the flow channels 504 formed entirely from adsorbent 505 plus binder. The cross section view 502C shows the adsorbent layer 506 comprised of solid adsorbent (e.g. microporous or mesoporous) particles 510A-510X (510) and solid particles (thermal mass) 508A-508X (508) that act as heat sinks. The adsorbent layer 506 may further include a blocking agent (not shown) and open meso and micropores 512A-512X (512) between the particles 510 and 508. As shown, the microporous adsorbent particles 510 occupy about 60% of the volume of the adsorbent layer 506 and the particles of thermal mass 508 occupy about 5% of the volume. With this composition, the voidage (e.g. flow channels) is about 55% of the volume occupied by the microporous adsorbent particles 510. The volume of the adsorbent 510 (e.g. microporous or meosporous) can range from about 25% of the volume of the adsorbent layer 506 to about 98% of the volume of the adsorbent layer 506. In practice, the volume fraction of solid particles 508 used to control heat will range from about 0% to about 75%, preferably about 5% to about 75%, and more preferably from about 10% to about 60% of the volume of the adsorbent layer 506. A blocking agent fills the desired amount of space or voids left between particles 508 and 510 so that the volume fraction of open mesopores and macropores 512 in the adsorbent layer 506 is less than about 20%.

FIG. 5B shows an alternative exemplary embodiment of a monolithic parallel channel contactor 500B in an isometric view 502A, a cut-out view 502B, and a detail view 502C. The contactor 500B is a structured flow through adsorbent contactor having parallel channels 504A-504X (504) similar to the contactor 500A, but wherein alternate channels are closed at one end by a plug 503A-503X (503). The flow pattern 507 through the monolith 500B is similar to that of a monolithic soot filter often used in the automotive industry. Gas entering the open flow channels 504 flows through the adsorbent layer 506 via the pores 512 and exits through an adjacent channel 503.

The structured flow through adsorbent contactor 500B provides highly efficient mass transfer but is generally constructed with greater pressure drop than a parallel channel contactor 500A. This extremely efficient mass transfer between the gas stream 507 and the adsorbent 505 can be important in removing oil down to low concentrations. For many compressor oils it is possible to drop the oil concentration in the purified stream 208 coming out of the contactor to less than 10 ppm by weight and preferable less than 10 ppb by weight.

When the monolith 500A or 500B is used in a gas separation process that relies on a kinetic separation (e.g. process 300) it is advantageous for the microporous adsorbent particles 510 to be substantially the same size. It is preferred that the standard deviation of the volume of the individual microporous adsorbent particles 510 be less than 100% of the average particle volume for kinetically controlled processes. In a more preferred embodiment the standard deviation of the volume of the individual microporous adsorbent particles 510 is less than 50% of the average particle volume. The particle size distribution for zeolite adsorbents can be controlled by the method used to synthesize the particles. It is also possible to separate pre-synthesized microporous adsorbent particles by size using methods such as a gravitational settling column. It may also be advantageous to use uniformly sized microporous adsorbent or polymeric particles in equilibrium controlled separations.

Monoliths 500A and 500B may be formed, for example, directly from structured microporous or mesoporous adsorbents 505. If the microporous or mesoporous adsorbent 505 is a zeolite, for example, the monolith can be prepared by extruding an aqueous mixture containing effective amounts of a solid binder, zeolite and adsorbent, solid heat control particles, and polymer. The solid binder can be colloidal sized silica or alumina that is used to bind the zeolite and solid heat control particles together. The effective amount of solid binder will typically range from about 0.5 to about 50% of the volume of the zeolite and solid heat control particles used in the mixture. If desired, silica binder materials can be converted in a post processing step to zeolites using hydrothermal synthesis techniques and, as such, they are not always present in a finished monolith. A polymer is optionally added to the mixture for rheology control and to give greater extrudate strength. The extruded monolith 500 is cured by firing it in a kiln where the water evaporates and the polymer burns away, thereby resulting in a monolith of desired composition. After curing the monolith 500, the adsorbent layer 506 will have only about 20 to about 40 vol % mesopores and macropores. A predetermined amount of these pores can be filled with a blocking agent in a subsequent step such as by vacuum impregnation.

Another method by which a monolith 500 can be formed directly from a microporous or mesoporous adsorbent 505 is by extruding a polymer and microporous adsorbent mixture. Preferred microporous adsorbents for use in extrusion processes are carbon molecular sieves and zeolites. Non-limiting examples of polymers suitable for the extrusion process include epoxies, thermoplastics, and curable polymers such as silicone rubbers that can be extruded without an added solvent. When these polymers are used in the extrusion process, the resulting product will preferably have a low volume fraction of meso and macropores in the adsorbent layer.

Figure 6:
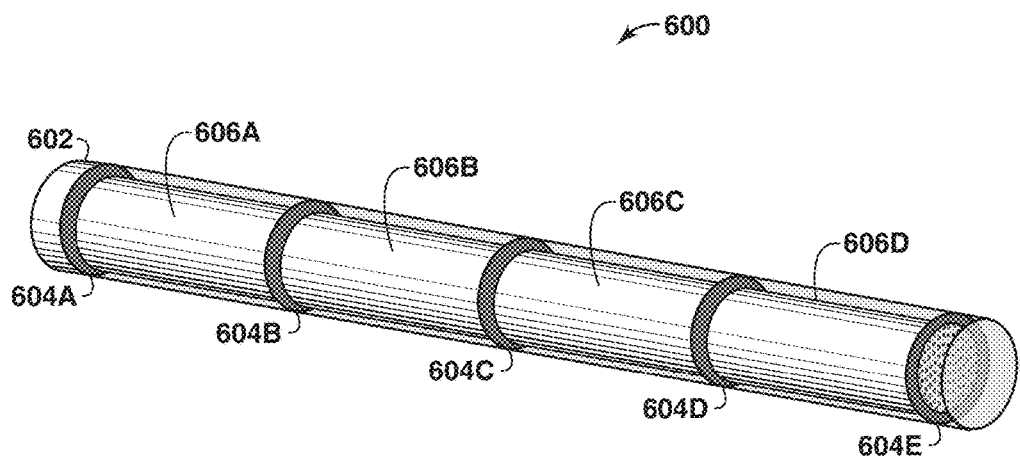
FIG. 6 is an illustration of an exemplary segmented contactor, which may be used in combination with the adsorbent beds as disclosed in FIGS. 2 and 5A-5B.

FIG. 6 is an illustration of an exemplary segmented contactor, which may be used in combination with the adsorbent beds as disclosed in FIGS. 2 and 5A-5B. As such, FIG. 6 may be best understood with reference to FIGS. 2 and 5A-5B. The segmented contactor 600 includes a tubular housing 602 for containing multiple adsorbent beds 606A-606D, which are separated by seals 604A-604E. The seals 604A-604E prevent flow from bypassing the contactors 606A-606D, which may be selected from any combination of the contactors 500A-500B. For example, contactor 606A may be a parallel channel monolithic contactor 500A and contactors 606B-606D are structured flow through adsorbent contactors 500B. In another example, one or all of the contactors 606A-606D may be a flow through adsorbent.

The segmented contactor arrangement 600 is configured to beneficially mitigate the effect of variances in the size of flow channels 504 in parallel channel contactors 500A or 500B. In the segmented contactor 600 gas flowing out of one parallel channel contactor 606A enters the next contactor 606B. Besides mitigating the effect of variances in channel size, this arrangement allows the use of different adsorbent materials in different contactors 606A-606D. Utilizing multiple adsorbent materials can be advantageous to ensure optimum removal of oil by removing species that interfere with oil adsorption as well as allowing for use of adsorbents with different pore sizes to optimally remove different molecular weight oil molecules. The seals 604A-604E may be made from a sealing material such as graphite. Such a segmented arrangement also mitigates the effect of stress built-up from thermal expansion if the swing adsorption unit 204 is regenerated in a thermal swing or calcination process.

In a preferred embodiment, the swing adsorption unit contains both segmented parallel channel contactors and flow through adsorbents. This embodiment offers excellent contacting properties without introducing significantly larger pressure drops (e.g. greater than 200 psi) through the swing adsorption unit 204.

EXAMPLES

Example 1: Example of Fuel Gas Composition that Will not Condense in the Seals

Sources of seal gas can include any convenient extraction point in a gas production or treating process, such as at compressor discharge, as long as the discharge pressure is greater than the suction pressure of the compressor being sealed (i.e., the pressure needed to form a dry gas seal in a compressor). When the pressure of the gas is lowered (e.g., throttling across the seal), the temperature can drop such that some of the seal gas condenses.

Figure 7:
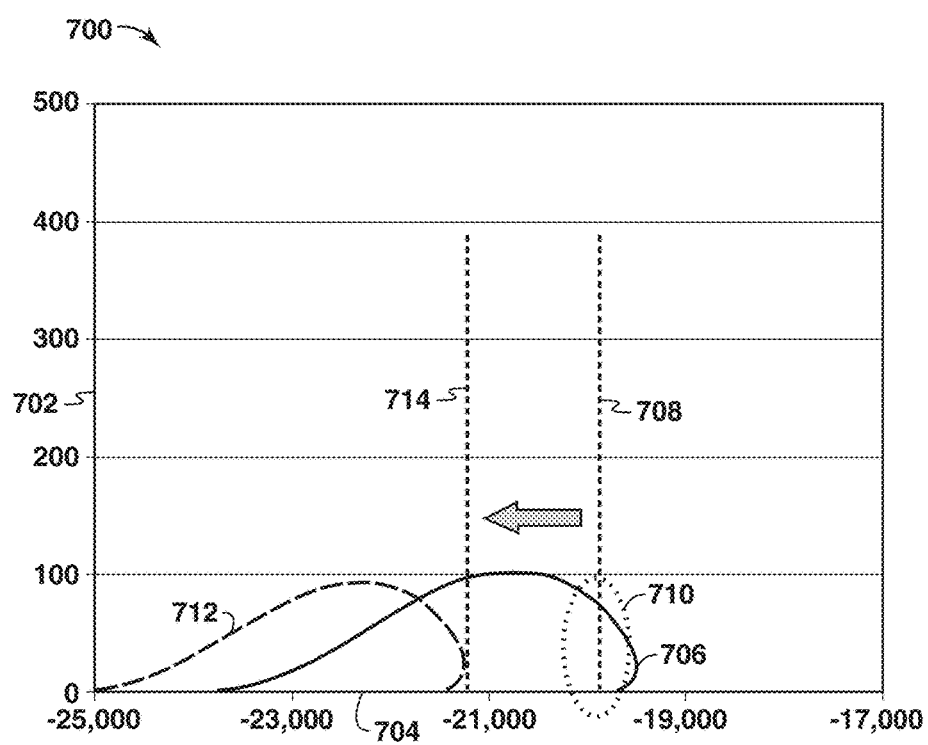
FIG. 7 illustrates an exemplary graph comparing the phase envelopes of a treated seal gas and an untreated seal gas.

FIG. 7 illustrates an exemplary graph comparing the phase envelopes of a treated seal gas and an untreated seal gas. The graph 700 relates pressure 702 in bar absolute (bara) and enthalpy 704 in kilo-calories per kilogram moles (kcal/kg·mol). A phase envelope of an untreated gas 706 is shown along with line 708 indicating an isenthalpic throttling of the untreated gas 706 across the seal. The exemplary seal gas 706 is taken from compressor discharge at 388 bara and has a composition similar to the following:

| Component | Mol fraction |
|---|---|
| $N_2$ | 0.0108 |
| $H_2S$ | 0.1622 |
| $CO_2$ | 0.0324 |
| Methane | 0.5932 |
| Ethane | 0.1084 |
| Propane | 0.0579 |
| i-Butane | 0.0081 |
| n-Butane | 0.0157 |

-continued

| Component | Mol fraction |
|---|---|
| i-Pentane | 0.0041 |
| n-Pentane | 0.0037 |
| n-Hexane | 0.0019 |
| n-Heptane | 0.0007 |
| COS | 0.0001 |
| M-Mercaptan | 0.0002 |
| NBP[O]116 | 0.0003 |
| NBP[O]135 | 0.0001 |

As shown in the graph 700, when the pressure reaches about 70 bara, some components of the gas begin to condense (e.g., the gas reaches its dewpoint as indicated by the phase envelope 706). This "two-phase region" is circled by oval 710. Further expansion causes more of the gas to condense. Formation of these condensed liquids could damage the seal. To alleviate this problem, certain components of the seal gas are removed (e.g., 95% of the $H_2S$, 90% of C5+) resulting in a treated gas having a treated gas phase envelope 712 with a complimentary line 714 denoting isenthalpic throttling of the treated gas 712 across the seal. As shown, in the treated case, the gas 712 does not enter the two phase region upon throttling, thus ensuring that seal gas remains "dry". To achieve this result, the adsorbent material selectively removed the $H_2S$ and the $C_{5+}$ material, and enriched the stream in methane. To achieve this result the selectivity for the $H_2S$ with respect to methane must be greater than 5 and the selectivity of the $C_{5+}$ components with respect to methane must be greater than 5.

Example 2

The shape of the adsorption front that moves through a parallel channel contactor 500A during the oil adsorption step is modeled. This modeling used a competitive Langmuir isotherm to predict the loading of oil in the adsorbent 505. For the targeted adsorbents, the adsorption strength (e.g. selectivity) of the oil is expected to be so large that a sharp or shock wave like adsorption front moves through the contactor 500A. This type of behavior allows the adsorbent volume in the contactor 500A to be used efficiently, minimizing the adsorbent volume required and maximizing the length of an adsorption cycle.

This model simulates a single channel 504A of a solid adsorbent 506 without open mesoporous voids, open macropores, or heat adsorbing material. Due to symmetry it is sufficient to model a single channel 504A. The modeling follows an oil adsorption front that moves through the contactor 500A in an adsorption step 306 that follows after a calcination step 308. After the calcination step 308, all oil has been removed from the adsorbent layer 506. At this point, the fugacity in the channel 504A is near 1 bara, and the channel 504A is filled with air. Air is purged from the channel 504A with nitrogen and the channel 504A is then pressurized with a fuel gas containing oil vapor (e.g. fuel gas stream 106). For the simulation, the vapor fugacity of the oil is taken to be $6 \times 10^{-5}$ bar, and the total fugacity of the fuel gas 106 at the entrance to the channel 504A at the end of the pressurization step is 300 bara. The total time to pressurize the 5 µm channel 504A used in the simulation is 1.04 seconds. When the pressurization is completed and the channel fugacity drop along channel 504A reaches 3.2 bar/m, fuel gas is allowed to flow through the channel 504A with a superficial velocity of 0.091 meters per second (m/s) at 373 Kelvin (K). At this flow rate, the 0.012 centipoise (cP) fuel gas 106 has the same fugacity drop along the channel 504A as that at the end of the pressurization step of 3.2 bar/m. In the simulation, the adsorbent thickness is taken to be 3 µm and the channel length is taken to be 1 m. The model is based on the actual parallel channel contactor, and is suitably scaled to capture the transport phenomena occurring in the full system 204.

The oil adsorption from the flowing gas stream is described with a linear driving force model (LDF) that employs a competitive Langmuir adsorption isotherm. The product of the Langmuir adsorption coefficient ($b_{oil}$) and fugacity ($P_{oil}$) for oil was taken to be to be 4, corresponding to adsorption in the non-linear region of the isotherm. The Langmuir adsorption coefficient ($b_{gas}$) for the fuel gas ($3.89 \times 10^{-7}$ $Pa^{-1}$) was based on representative values for methane adsorption in mesoporous adsorbents such as the M41S family of materials. For many oils in several different mesoporous adsorbents the Langmuir adsorption coefficients ("b values") are expected to be greater than that used in this simulation. A larger b value will lead to an even sharper adsorption front than those modeled in this example. The characteristic time scale for adsorption defined by the LDF constant of 0.1 seconds is chosen to match the physical properties expected for the mesoporous adsorbent layer. As such, the LDF time constant is much smaller than the gas residence time in the flow channel. Because of the small channel dimension (5 µm) the model is justified in neglecting axial dispersion of the gas within the channel. Because of the high gas fugacity and low oil concentrations (Oil Mole Fraction=$2 \times 10^{-7}$) the heat capacity of the fuel gas limits the temperature rise and the adsorption process can be modeled as isothermal.

Figure 8:
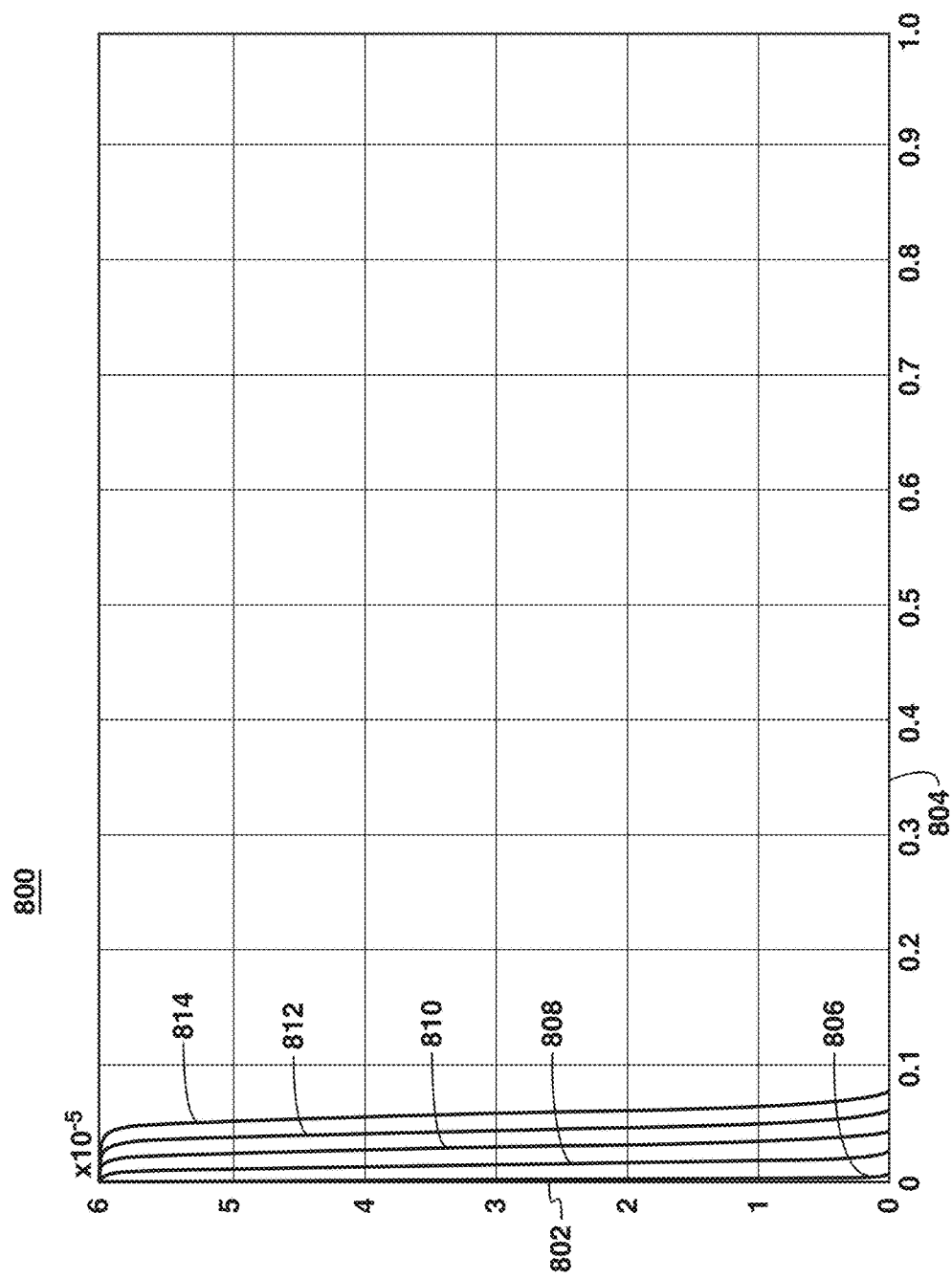
FIG. 8 illustrates an exemplary graph of an oil front advancing through an adsorbent channel based on modeling of the Langmuir isotherm.

FIG. 8 illustrates an exemplary graph of an oil front advancing through an adsorbent channel based on modeling of the Langmuir isotherm. The graph 800 plots oil pressure ($P_{oil}$) 802 in bar versus length 804 in meters. The simulation takes place over a 50,000 second time frame. The oil fronts 806, 808, 810, 812 and 814 represent fugacity profiles at times of 0, 12,500, 25,000, 37,500 and 50,000 seconds, respectively. As shown, the oil fugacity profiles form a sharp adsorption front within about 0.08 m of the adsorbent bed inlet. The oil fugacity measured in the channel at a point immediately past the adsorption front suggests that greater than 99.99999 percent of the oil has been removed from the feed. This also suggests that the product exiting the channel outlet is essentially pure fuel gas for long periods of time extending past the time simulated above. This behavior will remain the same at lower oil partial fugacities. Simulations performed using thicker adsorbent beds suggest that the propagation of the oil adsorption front will be further restricted to an even smaller region of the bed close to the inlet. If an oil mist (i.e. liquid and vapor) is present, a sharp front still advances through the channel, but because of the increased oil concentration, proceeds further along the channel than shown in graph 800. For the results described, the selectivity of the adsorbent with respect to methane must be greater than 10 and preferable greater than 100, and even more preferable greater than 1000.

Example 3

To establish conditions under which oil could be calcined, a 2 gram sample of mesoporous MCM-41 zeolite was loaded with about a 1,900 gram/mole polyglycol compressor oil. The zeolites were loaded by contacting the MCM-41 zeolite with the polyglycol oil in an amount close to incipient wetness. This required approximately 0.24 grams of oil. To further reduce the amount of oil that is not adsorbed in the zeolite the samples were placed in a vacuum oven and held at 125° C. for 12 hours at a pressure of less than 1 millimeter of mercury (mmHg)—about 0.00133 bar. When the samples were removed from the vacuum oven the amount of oil adsorbed was found to be greater than 10 wt % of the sample mass. To measure the rate at which this oil can be removed by calcination, thermogravimetric (TGA) experiments were performed. The batch of oil containing MCM-41 material was divided into about 2 to about 25 milligram (mg) samples that were repetitively placed in the TGA. The TGA was operated with air and each sample was allowed to sit for more than 1 hour at 125° C. after being introduced into the TGA on a platinum pan whose weight was known. For each sample, the temperature was then stepped up to the temperature where calcination was to be studied and the rate of weight loss recorded. Each sample was held at the calcinaiton temperature for more than 30 minutes and then the + temperature was increased to a final temperature greater than 550° C. At temperatures as low as 300° C. all of the oil burned or calcined off in less than 1 minute. This was approximately the amount of time required to heat the sample to the calcination temperature. These rapid kinetics and complete removal of oil were seen in experiments where the calcination temperature was 325, 350, 375, 400 and 450° C. At temperatures between 225 and 275° C. a slower but steady loss of oil due to calcination was observed. To prove that this weight loss was due to calcination the TGA protocol was repeated using nitrogen rather than air. With nitrogen, very slow weight losses with time constants in the hour to several day range were recorded. As might be expected the rate of weight loss increased with increasing temperature.

Example 4

This example illustrates a contactor that removes about 2 gram/minute of compressor oil from about a 5 MMSCFD fuel gas that has been compressed to 330 bara. When the stream is discharged from the compressor it is at a temperature between 85 and 115° C. The fuel gas has the composition shown in the table below. When the fuel gas is fed into dry seals at a temperature near that at which it is discharged from the compressor it will not enter a 2 phase region as it expands across the seal faces. The only liquid that appears as the gas expands across the seal faces comes from the compressor oil. In this example, the compressor oil is a polyglycol with a number average molecular weight of 1,900 gram/mole.

| Molecular Component | Mole % |
|---|---|
| H2O | 0.0006 |
| N2 | 1.4644 |
| H2S | 0.0001 |
| CO2 | 0.0004 |
| Methane | 80.5117 |
| Ethane | 14.6952 |
| Propane | 3.1856 |
| i-Butane (C4) | 0.0650 |
| n-Butane (C4) | 0.0691 |
| i-Pentane | 0.0040 |
| n-Pentane | 0.0020 |
| n-Hexane | 0.0002 |
| n-Heptane | 0.0018 |

Monolithic parallel channel contactors of the type shown in FIGS. 5A and 5B are used to remove oil from the compressed fuel gas stream. In one exemplary system, a total of six about 40 cm long monolithic parallel channel contactors are stacked inside a 2.5 meter long, 3 inch diameter tube. In this example, three of each contactor style are stacked within the tubes. The contactors are held in place within the tube with either a ceramic packing material or with pyrolytic graphite gaskets. The monoliths are formed from alumina bound MCM-41 zeolite and the six monoliths contain a total of 10 kilograms of MCM-41. Size of the individual MCM-41 particles is 1 micron. The amount of zeolite needed in each tube is sized by measurements at lower pressures of the adsorption capacity for saturated oil vapor in MCM-41 samples. These measurements show that MCM-41 is capable of adsorbing about 15 wt % of saturated oil vapor and/or liquid droplets of about 1900 molecular weight oil at temperatures of about 100° C. At high pressure conditions, similar adsorption capacities are expected and a square oil adsorption isotherm is still predicted (i.e. a very high b value for a Langmuir Isotherm).

Flow channels in the monoliths are 500 micron in diameter and occupy 10-30% of the crossectional area of the monoliths. The 5 MMSCFD fuel gas flow is split between four 2.5 meter long tubes and the adsorption step is carried out for 12 hours. At the end of a 12 hour adsorption step the oil adsorption front has not broken through to the end of the tubes. When the adsorption step is completed four other tubes that have finished regeneration 308 are valved on-line to continue removing oil (i.e. they start the adsorption step 306). The four tubes that have been undergoing an adsorption step are regenerated 308. The tubes are regenerated by depressurizing them to 4 atmospheres (about 4 bar) and beginning to flow compressed air that has been heated to 325° C. through the tubes. Air flow rate in each tube during this phase of the regeneration process is between 1 and 50 SCFM, and the hot air is flowed for a time between 5 and 40 minutes at which point the front of the first monolith has heated-up to the point that a calcination reaction has been initiated. Heat released from the calcination reaction can be in a range from 1-20 kilowatts. To limit the temperature rise as the calcination reaction proceeds, long duration pulses of nitrogen are introduced. The duration of the nitrogen pulses can be 2-50 times longer than the air pulses. The calcination process is completed in less than 6 hours and the tubes are cooled for 4 hours by flowing either compressed air or pressurized nitrogen through them before another adsorption step is begun.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A system for treating a gaseous feed stream, comprising:
a selective component removal system, comprising:
a gaseous feed stream inlet configured to pass a gaseous feed stream into a swing adsorption unit having at least one structured adsorbent bed comprising a high surface area solid, wherein:
the gaseous feed stream includes a volume of oil droplets and a volume of oil vapor and has a pressure from at least about 100 bar to at least about 500 bar;
the at least one structured adsorbent bed is configured to remove at least a portion of the volume of oil droplets and a portion of the volume of oil vapor to provide a substantially oil-free gaseous outlet stream; and the at least one structured adsorbent bed is regenerated in a kinetic swing adsorption process; and one or more compressors configured to receive a sour gas process stream, to receive a portion of the substantially oil-free gaseous outlet stream, to compress the sour gas process stream and to utilize the portion of the substantially oil-free gaseous outlet stream as a dry seal gas.

2. The system of claim 1, wherein the kinetic swing adsorption process is selected from the group consisting of a calcination process, a temperature swing process, a pressure swing process, an inert purge process, and any combination thereof.

3. The system of claim 2, wherein the system is configured to remove the volume of oil droplets and vapor in a sharp adsorption front as modeled by a Langmuir isotherm.

4. The system of claim 3, wherein the at least one structured adsorbent bed is regenerated by raising the temperature of the structured adsorbent bed to at least about 250° C.

5. The system of claim 2, wherein the structured adsorbent bed is regenerated by a thermal wave process.

6. The system of claim 2, wherein the structured adsorbent bed is regenerated by a gas or fluid flowed co-currently, counter-currently, or orthogonally (e.g. crossflow) to a flow direction of the gaseous feed stream.

7. The system of claim 1, further comprising a fluid impermeable housing substantially surrounding the swing adsorption unit.

8. The system of claim 7, wherein the fluid impermeable housing is operable at up to about 10,000 pounds per square inch.

9. The system of claim 2, wherein the structured adsorbent bed is selected from the group consisting of a parallel channel contactor, a structured flow through adsorbent contactor, a flow through adsorbent, and any combination thereof.

10. The system of claim 9, further comprising a segmented contactor configured to house at least two structured adsorbent beds, wherein each pair of structured adsorbent beds is separated by a seal.

11. The system of claim 1, wherein the oil is a substantially ash-free oil.

12. The system of claim 1, wherein the oil is a synthetic composed of a random copolymer of ethylene oxide and propylene oxide.

13. The system of claim 12, wherein the random copolymer of ethylene oxide and propylene oxide has an average molecular weight greater than about 1,200 gram/mole and less than or equal to about 2,500 gram/mole.

14. The system of claim 1, further comprising a cooling jacket operatively engaging the at least one structured adsorbent bed.

15. The system of claim 2, further comprising a heater selected from the group consisting of an indirect electric adsorbent bed heater, a direct electric adsorbent bed heater, a direct gas heating fluid, and any combination thereof.

16. The system of claim 1, further comprising a heat exchanger configured to utilize cooling fluid to cool the substantially oil-free gaseous outlet stream.

17. The system of claim 1, further comprising an accumulator configured to hold the substantially oil-free gaseous outlet stream.

18. The system of claim 1, wherein the high surface area solid is selected from the group consisting of: alumina, mesoporous solids, and microporous solids.

19. The system of claim 18, wherein the high surface area solid is selected from the group consisting of: aluminas, carbons, activated carbon, charcoal, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials (microporous and mesoporous materials comprised of a metal organic framework) and ZIF materials (microporous and mesoporous materials comprised of zeolitic imidazolate frameworks).

20. The system of claim 18, wherein the high surface area solid has a surface area greater than about 10 square meters per gram ($m^2$/gm).

21. The system of claim 3, wherein greater than 99.99999 percent of the oil is removed from the gaseous feed stream.

22. The system of claim 18, wherein the high surface area solid is a 12-14 ring zeolite with a Si to Al ratio of more than about 50:1.

23. The system of claim 18, wherein the high surface area solid is an ordered mesoporous material of the M41S family.

24. The system of claim 1, further comprising a conditioning unit.

* * * * *